US010554265B2

(12) United States Patent
Venkatachalam Jayaraman et al.

(10) Patent No.: US 10,554,265 B2
(45) Date of Patent: Feb. 4, 2020

(54) METHODS AND APPARATUS FOR PROVIDING LIVE FEEDBACK

(71) Applicant: QUALCOMM Incorporated, San Diego, CA (US)

(72) Inventors: Venkata Ramanan Venkatachalam Jayaraman, San Diego, CA (US); Abhishek Pramod Patil, San Diego, CA (US); Yan Zhou, San Diego, CA (US); Alfred Asterjadhi, San Diego, CA (US); George Cherian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/105,393

(22) Filed: Aug. 20, 2018

(65) Prior Publication Data

US 2019/0068253 A1 Feb. 28, 2019

Related U.S. Application Data

(60) Provisional application No. 62/548,939, filed on Aug. 22, 2017.

(51) Int. Cl.
*H04B 7/0417* (2017.01)
*H04L 1/00* (2006.01)
(Continued)

(52) U.S. Cl.
CPC ......... *H04B 7/0417* (2013.01); *H04B 7/0619* (2013.01); *H04L 1/0035* (2013.01);
(Continued)

(58) Field of Classification Search
CPC ... H04B 7/0417; H04B 7/0619; H04L 1/0035; H04L 27/2627; H04L 1/0027; H04W 52/04; H04W 72/0453; H04W 84/12
See application file for complete search history.

(56) References Cited

U.S. PATENT DOCUMENTS 9,560,594 B2 * 1/2017 Cho ................. H04W 52/0238
2007/0195731 A1 * 8/2007 Camp, Jr. ............. H04W 72/04
370/329
(Continued)

FOREIGN PATENT DOCUMENTS

AU 2015343259 A1 4/2017
WO 2012044863 A1 4/2012

OTHER PUBLICATIONS

International Search Report and Written Opinion—PCT/US2018/047276—ISA/EPO—dated Nov. 20, 2018.

*Primary Examiner* — Janice N Tieu
(74) *Attorney, Agent, or Firm* — Arent Fox, LLP

(57) ABSTRACT

Features related to providing feedback corresponding to a portion of a data frame while another portion of the data frame is being received are described. In an aspect, a first device may transmit, to a second device, at least one MPDU of a plurality of MPDUs within the data frame via a data channel, and receive feedback corresponding to the at least one MPDU in a feedback channel while at least a first MPDU of the remaining MPDUs within the data frame is being transmitted. In another aspect, a first device, e.g., receiver of data frame, may receive, from a second device, at least one MPDU of a plurality of MPDUs within a data frame, and transmit feedback corresponding to the at least one MPDU while at least a first MPDU of the remaining MPDUs within the data frame is being received.

26 Claims, 18 Drawing Sheets

(51) Int. Cl.
*H04W 52/26* (2009.01)
*H04B 7/06* (2006.01)
*H04L 27/26* (2006.01)
*H04W 72/04* (2009.01)
*H04W 84/12* (2009.01)

(52) U.S. Cl.
CPC ....... *H04L 27/2627* (2013.01); *H04W 52/262* (2013.01); *H04W 72/0453* (2013.01); *H04L 1/0027* (2013.01); *H04W 84/12* (2013.01)

(56) References Cited

U.S. PATENT DOCUMENTS

| | | | | |
|---|---|---|---|---|
| 2016/0242195 | A1* | 8/2016 | Kwon | H04W 72/121 |
| 2016/0277170 | A1 | 9/2016 | Jia et al. | |
| 2016/0330007 | A1* | 11/2016 | Cherian | H04L 5/0055 |
| 2017/0127424 | A1* | 5/2017 | Kherani | H04L 5/0055 |
| 2017/0164392 | A1* | 6/2017 | Merlin | H04W 72/1268 |

* cited by examiner

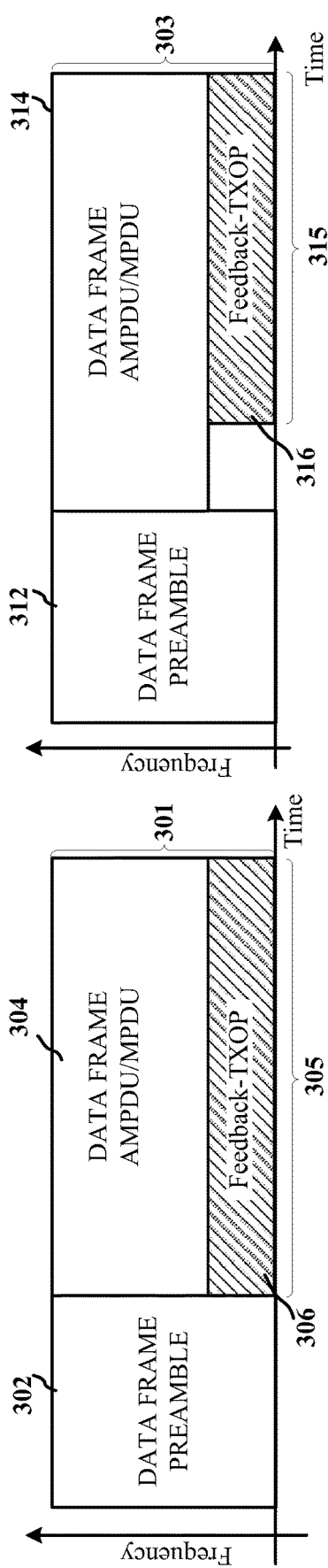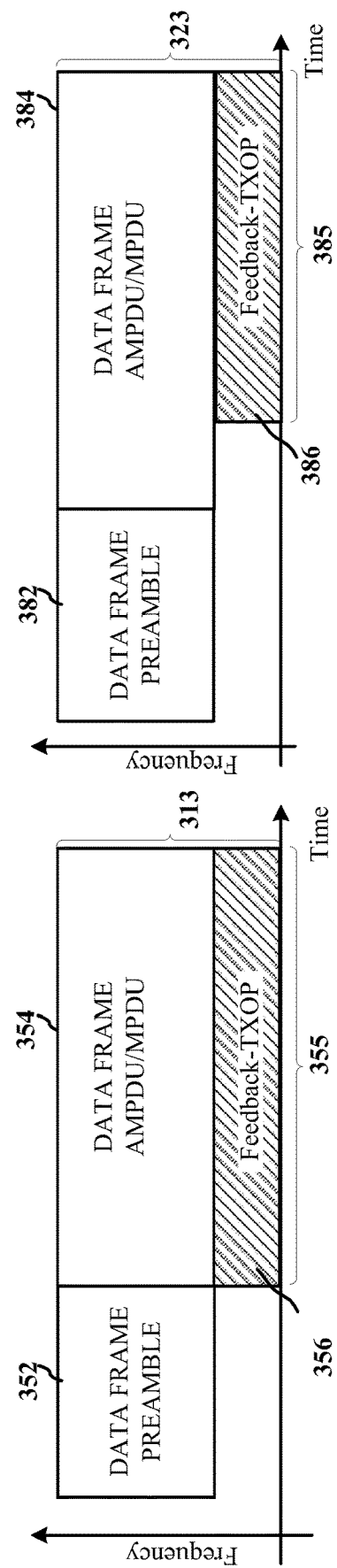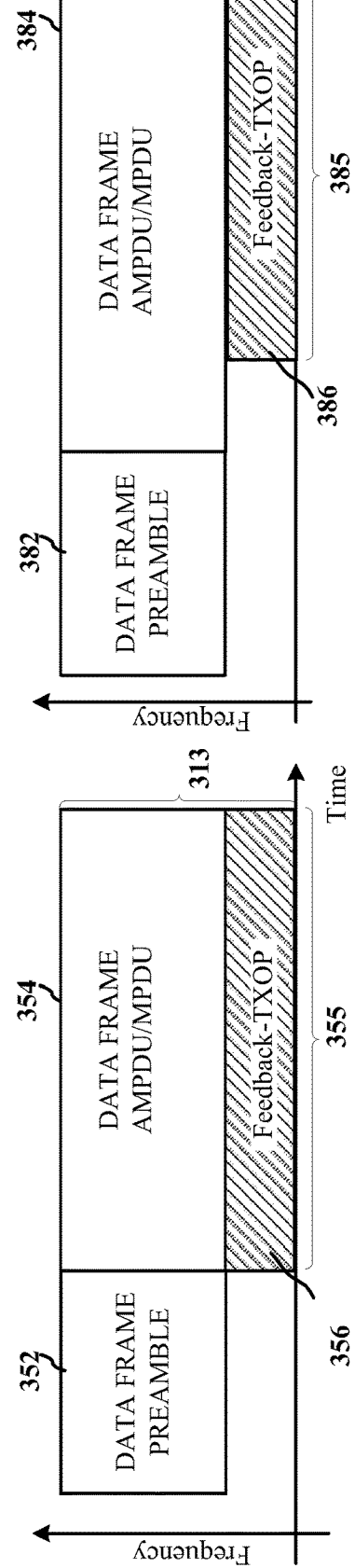

METHODS AND APPARATUS FOR PROVIDING LIVE FEEDBACK

CROSS-REFERENCE TO RELATED APPLICATION(S)

This application claims the benefit of U.S. Provisional Application Ser. No. 62/548,939 entitled "METHODS AND APPARATUS FOR PROVIDING LIVE FEEDBACK" filed on Aug. 22, 2017, which is expressly incorporated by reference herein in its entirety.

TECHNICAL FIELD

The present disclosure relates generally to wireless communication, and more particularly, to methods and apparatus related to providing live feedback corresponding to a received portion of a data frame, in a feedback channel while another portion of the data frame is being received via a data channel.

DESCRIPTION OF THE RELATED TECHNOLOGY

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer-readable media, and devices disclosed herein each have several aspects, no single one of which is solely responsible for the desirable attributes. Without limiting the scope of this disclosure as expressed by the claims which follow, some features will now be discussed briefly. After considering this discussion, and particularly after reading the section entitled "Detailed Description," a person having ordinary skill in the art will understand how the disclosed features provide advantages for devices in a wireless network.

In an 802.11 compliant system, the feedback regarding decoding performance may be available only after an entire frame has been transmitted, and may be limited in information, for example, the feedback may only indicate pass/fail, that is, whether the decoding of one or more data units of the frame has been successful or not. For example, after receiving a data frame and attempting decoding, a receiver may send a block acknowledgement (BlockAck) that provides binary information indicating whether a data unit was successfully decoded or not as the feedback to the transmitter. The transmitter may use the feedback information to adapt one or more parameters and/or attributes in order to increase the probability that the receiver is able to decode the next data frame. Because the feedback is provided by the receiver after the transmission of the entire frame, the transmitter cannot adjust/adapt any parameters in the transmission of the current frame and may only make such adjustments for the next data frame to be transmitted.

Various aspects described herein relate to providing live feedback for a data frame concurrently with the reception of the data frame. In other words, while a transmitter is transmitting a data frame, a receiver (e.g., the device that received at least a portion of the data frame) generates and transmits feedback to the transmitter enabling the transmitter to adjust or modify one or more transmission parameters used to transmit the current data frame. Various aspects relating to configuring a feedback channel that may carry the live feedback and various different types of feedback that may be provided are also described infra.

One innovative aspect of the subject matter described in this disclosure can be implemented in a method for wireless communication by a first wireless communication device. In some implementations, the method includes receiving, from a second wireless communication device, at least one medium access control (MAC) protocol data unit (MPDU) of a plurality of MPDUs within a data frame via a first wireless communication channel. In some implementations, the method further includes transmitting, to the second wireless communication device, first feedback information corresponding to the at least one MPDU in a second wireless communication channel while at least a first MPDU of the remaining MPDUs of the plurality of MPDUs within the data frame is being received by the first wireless communication device.

Another innovative aspect of the subject matter described in this disclosure can be implemented in a first wireless communication device. The first wireless communication device may be a receiver of a data frame such as an access point or a station. In some implementations, the first wireless communication device may include at least one processor coupled to at least one memory storing processor-executable code that, when executed by the at least one processor, causes the first wireless communication device to receive, from a second wireless communication device, at least one MPDU of a plurality of MPDUs within the data frame via a first wireless communication channel (e.g., a data channel). The at least one memory may further comprise processor-executable code that, when executed by the at least one processor, causes the first wireless communication device to transmit, to the second wireless communication device, first feedback information corresponding to the at least one MPDU in a second wireless communication channel (e.g., a feedback channel) while at least a first MPDU of the remaining MPDUs of the plurality of MPDUs within the data frame is being received by the first wireless communication device.

Another innovative aspect of the subject matter described in this disclosure can be implemented in another method for wireless communication for wireless communication by a first wireless communication device. In some implementations, the method includes transmitting, to a second wireless communication device, at least one MPDU of a plurality of MPDUs within a data frame via a first wireless communication channel. In some implementations, the method further includes receiving, from the second wireless communication device, first feedback information corresponding to the at least one MPDU in a second wireless communication channel while at least a first MPDU of the remaining MPDUs of the plurality of MPDUs within the data frame is being transmitted by the first wireless communication device.

Another innovative aspect of the subject matter described in this disclosure can be implemented in a first wireless communication device. The first wireless communication device may be a transmitter of a data frame such as an access point or a station. In some implementations, the first wireless communication device may include at least one processor coupled to at least one memory storing processor-executable code that, when executed by the at least one processor, causes the first wireless communication device to transmit, to a second wireless communication device, at least one MPDU of a plurality of MPDUs within the data frame via a first wireless communication channel, e.g., a data channel. The at least one memory may further comprise processor-executable code that, when executed by the at least one processor causes the first wireless communication device to receive, from the second wireless communication device, first feedback information corresponding to the at least one MPDU in a second wireless communication channel while at least a first MPDU of the remaining MPDUs of the plurality of MPDUs within the data frame is being transmitted by the first wireless communication device.

BRIEF DESCRIPTION OF THE DRAWINGS

FIGS. 3A-3D show examples of feedback and data frame transmissions occupying non-overlapping frequency channels within the same frequency band according to some implementations.

DETAILED DESCRIPTION

Figure 1:
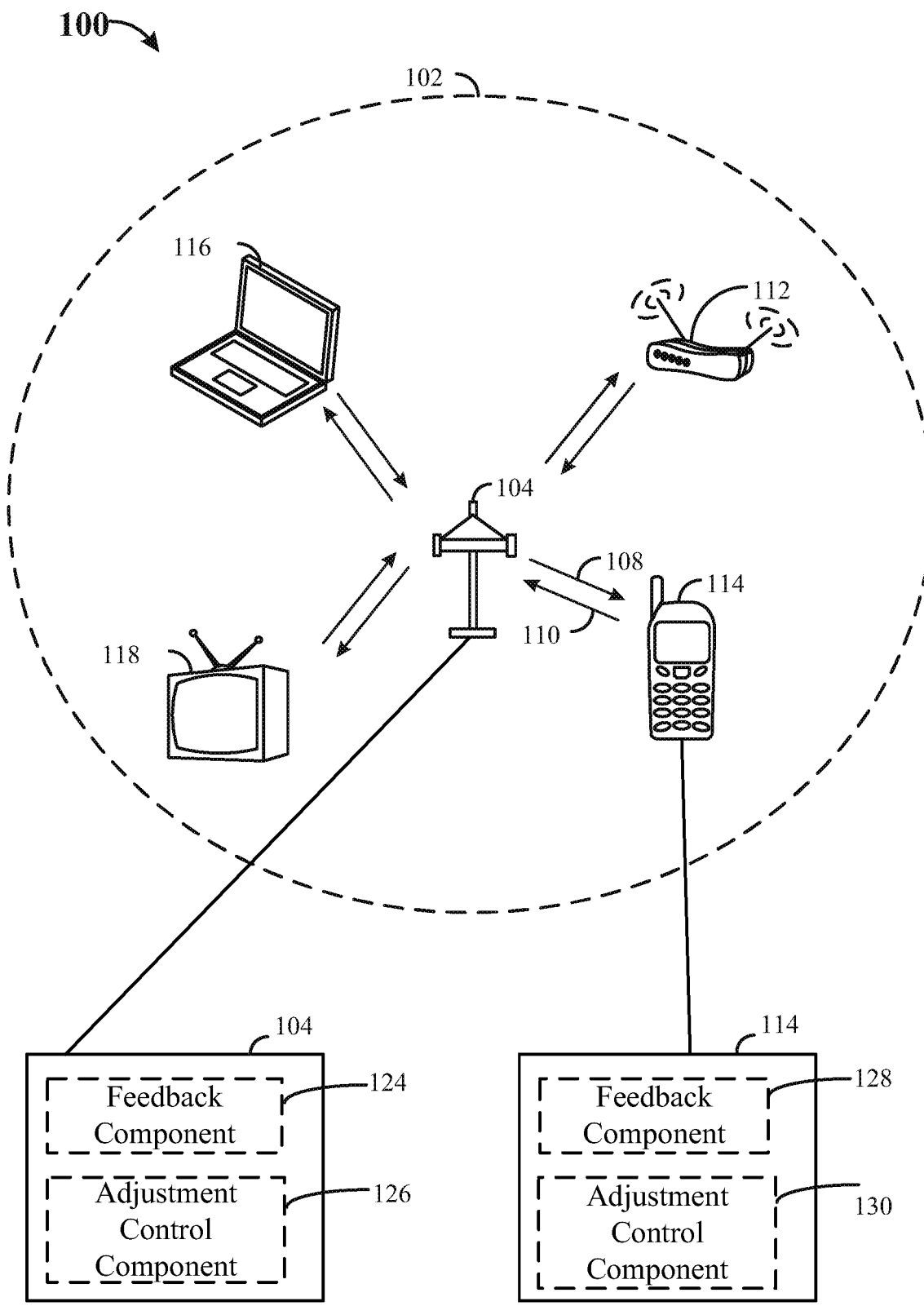
FIG. 1 shows an example wireless communication system in which aspects of the present disclosure may be utilized.

Various aspects of the novel systems, apparatuses, computer-readable media, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to persons having ordinary skill in the art. Based on the teachings herein a person having ordinary skill in the art should appreciate that the scope of the disclosure is intended to cover any aspects of the systems, apparatuses, computer program products, and methods disclosed herein, whether implemented independently of, or combined with, any other aspects of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various implementations of the aspects described herein. It should be understood that any aspect disclosed herein may be embodied by one or more elements of a claim.

Although particular aspects are described herein, many variations and permutations of these aspects fall within the scope of the disclosure. Although some benefits and advantages of various aspects are described or readily apparent, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description.

The detailed description and drawings are illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any wireless communication standard or protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of some devices implementing the 802.11 protocol may consume less power than devices implementing other wireless protocols, and/or may be used to transmit wireless signals across a relatively long range, for example about one kilometer or longer.

In some implementations, a WLAN includes various devices that access or provide access to the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks (WANs). In some implementations a STA may also function as an AP (for example, a "virtual AP" or hotspot) to provide access to other STAs.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment (UE), or some other terminology. In some implementations, a station may comprise a cellular telephone, a cordless telephone, a Session Initiation Protocol (SIP) phone, a wireless local loop (WLL) station, a personal digital assistant (PDA), another handheld device having wireless connection capability, or some other suitable processing device connected to a wireless modem. Accordingly, one or more aspects disclosed herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system (GPS) device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by persons having ordinary skill in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, some of the devices described herein may implement the 802.11 standard, for example, including any of the amendments thereto, for example, 802.11a, 802.11b, 802.11g, 802.11n, 802.11ac and 802.11ax, among others. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be utilized. The wireless communication system 100 may operate pursuant to a wireless standard, for example the 802.11 standard and any of the amendments thereto. The wireless communication system 100 may include an AP 104, which communicates with STAs (for example, STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM or orthogonal frequency-division multiple access (OFDMA) techniques. If this is the case, the wireless communication system 100 may be referred to as an OFDM or OFDMA system. Alternatively, signals may be sent and received between the AP 104 and the STAs in accordance with code division multiple access (CDMA) techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (for example, multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (for example, shared) amongst several devices and specific to a given device.

In some aspects, a STA (e.g., STA 114) may be required to associate with the AP 104 in order to send communications to and/or receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the AP 104 may include one or more components for performing various functions. For example, the AP 104 may include a feedback component 124 configured to perform operations related to providing feedback while a data frame is being received by the AP 104. The AP 104 may also include an adjustment component 126 to perform operations related to performing adjustments, such as an adjustment of one or more transmission or other parameters associated with a data frame transmission from the AP, based on feedback received from another device receiving the data frame transmission, for example, from STA 114.

In another aspect, the STA 114 may include one or more components for performing various functions. For example, the STA 114 may include a feedback component 128 configured to perform operations related to providing feedback while a data frame is being received by the STA 114. The STA 114 may also include an adjustment component 130 to perform operations related to performing adjustments, such as an adjustment of one or more transmission or other parameters associated with a data frame transmission from the STA 114, based on feedback received from another device receiving the data frame transmission, for example, from AP 104.

Figure 2:
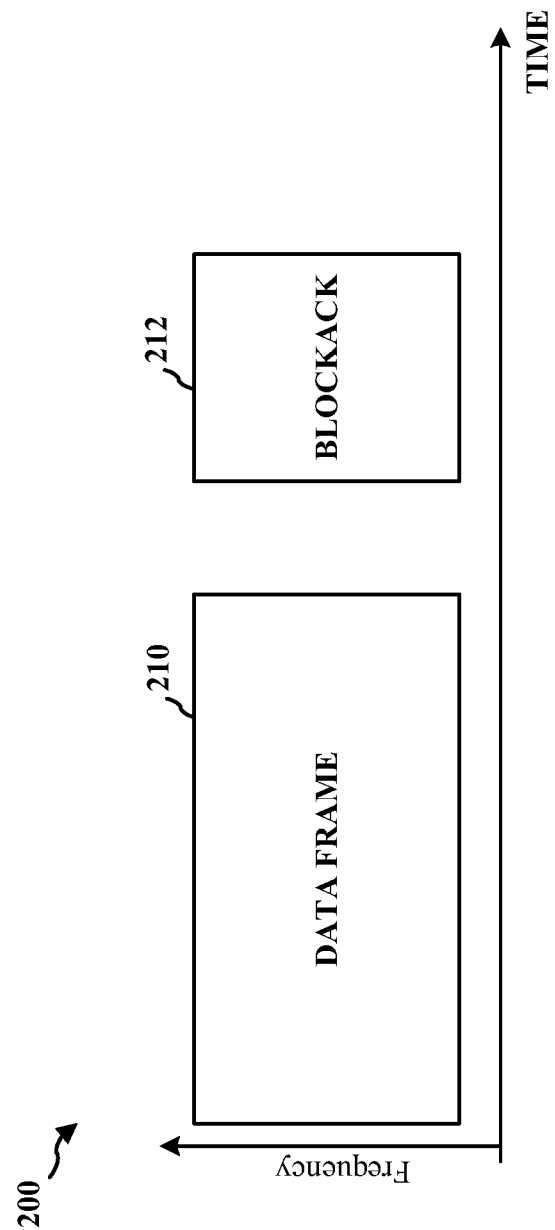
FIG. 2 shows an example of a data frame and a block acknowledgement that may be transmitted by a receiver of the data frame to a transmitter of the data frame.

In a typical 802.11 compliant system, the feedback regarding decoding performance is available only after an entire frame has been transmitted, and is limited in information. For example, the feedback may only provide an indication of decoding pass/fail, that is, whether the decoding of one or more MPDUs in the data frame has been successful or not. FIG. 2 shows an example of a data frame 210 and a block acknowledgement 212 that may be transmitted by a receiver of the data frame 210 to the transmitter of the data frame 210. In the discussion below, the terms transmitter (or "transmitting device") and receiver (or "receiving device") are used with regard to the data frame, that is, with the transmitter being the device that transmits the data frame and the receiver being the device that receives the data frame. After the receiver receives the data frame 210, the receiver may send the block acknowledgement (BlockAck) 212 to the transmitter. The BlockAck 212 can include feedback information based on the reception of the data frame. For example, the feedback information can include binary information indicating whether an MPDU was successfully decoded. The transmitter may use the feedback information to adapt a modulation and coding scheme (MCS) and transmit power in order to increase the decoding probability of the next data frame. Because the feedback is provided by the receiver after the transmission of the entire current frame, the transmitter cannot adjust (also used interchangeably herein with adapt or modify) one or more parameters in the transmission of the current frame; rather, the transmitter is capable of making such adjustments (for example, MCS, transmit power, and transmission rate) only for a subsequent frame to be transmitted.

To allow for on-the-fly adaptation, various aspects and features related to a control channel that carries live feedback from a receiver of a data frame to the transmitter of the data frame are described. The transmitter may use the feedback provided by means of the control channel to adjust transmission parameters such as transmit power, transmission rate and MCS, among other parameters, to improve the transmission of the current frame to increase the probability that the receiver is able to properly decode the frame.

In some implementations, a transmitter may simultaneously transmit to multiple receivers, for example, when utilizing downlink multi-user orthogonal frequency-division multiple access (DL MU-OFDMA) techniques or downlink multi-user multiple-input multiple-output (DL MU-MIMO) techniques. In such implementations, multiple feedback channels may be provided, one for each of the multiple receivers (for example, a plurality of STAs) to provide feedback to the transmitter (for example, an AP). Similarly, a receiver may receive simultaneously from multiple transmitters, for example, when utilizing uplink MU-OFDMA (UL MU-OFDMA) techniques or UL MU-MIMO techniques. In such implementations, multiple feedback channels may be provided, that is, from the single receiver (for example, an AP) to each of the multiple transmitters (for example, a plurality of STAs). For didactic purposes, the following discussion will focus on implementations in which a single transmitter transmits to a single receiver, or in which a single transmitter transmits to multiple receivers (for example, using DL MU-OFDMA). However, the described techniques are equally applicable to implementations in which multiple transmitters transmit to a single receiver as well (for example, using UL MU-OFDMA).

In various aspects, to provide a live feedback mechanism, a feedback channel is active while a current data frame is being transmitted by the transmitter and being received by the receiver. In other words, feedback is transmitted (by the recipient of a portion of the data frame) and received (by the transmitter of the data frame) through the feedback channel concurrently with the transmission and reception of at least a portion of the data frame through a data channel Such a feedback channel, that may be active while data is being received via the data channel, may be configured in several ways in various aspects as discussed infra.

For example, in some implementations, the feedback information and the data frame may occupy frequency channels in different frequency bands. For example, the receiver may transmit feedback via a feedback channel in a 2.4 GHz band while the transmitter may transmit data via one or more frequency channels in the 5 GHz band. In some other implementations, the feedback information and the data frame may occupy different frequencies (for example, different frequency channels) within the same frequency band (for example, the 2.5 GHz band or the 5 GHz band). Again, in such implementations, the receiver may transmit feedback via the feedback channel in parallel with the transmission of portions of the data frame by the transmitter. Thus, as discussed supra, between a given device pair (for example, a transmitter and receiver) more than one communication link may be supported (for example, control channel/link and data channel/link). In some implementations, separate control and data channels may be utilized which may be active at the same time and carry respective types of information (for example, feedback information and traffic data respectively). This may sometimes be referred to as multi-band or multi-link or multi-channel aggregation. As discussed above, the multiple channels/links may correspond to different frequency channels within the same frequency band, or different channels in different frequency bands.

In some other implementations in which both the transmitter and receiver support full duplex operation, the transmitter and receiver may simultaneously transmit and receive on the same frequencies (for example, within the same frequency channels). In such implementations, the feedback information and data frame may occupy overlapping frequencies. For example, the receiver may transmit the feedback via one or more of the same frequency channels simultaneously used by the transmitter to transmit the data. Thus, in one such implementation where full duplex operation is supported, the transmission of feedback information (from the receiver of a data frame) may occur simultaneously with the reception of one or more MPDUs of the data frame. In such an example, the feedback channel and the data channel may overlap in frequency.

In some implementations in which a transmitter may transmit data frames to multiple receivers (for example, using DL MU-OFDMA or DL MU-MIMO), the multiple receivers may transmit their respective feedback information via feedback channels that may be orthogonal in the spatial domain to, or otherwise spatially separated from, each other.

FIGS. 3A-3D show examples of feedback and data frame transmissions occupying non-overlapping frequency channels within the same frequency band according to some implementations. In each of the FIGS. 3A-3D, the horizontal axis represents time while the vertical axis represents frequency. For example, FIG. 3A shows feedback 306 being transmitted through a feedback channel concurrently with the transmission of a data frame 304 through one or more frequency channels within the same frequency band 301 as the feedback channel. In some implementations, the data frame 304 is an aggregated MPDU (AMPDU) including multiple MPDUs. As shown, the feedback 306 is transmitted in a feedback channel that is non-overlapping with the one or more frequency channels in which the data frame 304 is transmitted.

In some implementations, a feedback transmission opportunity (TXOP) 305 may be defined (in the time domain) as the time window during which the transmission of the feedback 306 is allowed to occur. In some such implementations, the feedback-TXOP 305 may start at the end of a data frame preamble 302 or a fixed duration after the data frame preamble 302. In some such implementations, the feedback-TXOP may continue until the end of the data frame 304. As shown, the feedback-TXOP 305 and the data frame 304 overlap in time. Thus, the feedback channel used to transmit the feedback 306 is active while the data frame 304 is being transmitted.

FIG. 3B shows feedback 316 being transmitted through a feedback channel concurrently with the transmission of a data frame 314 through one or more frequency channels within the same frequency band 303 as the feedback channel. Similar to the implementation shown in FIG. 3A, the feedback channel used to transmit the feedback 316 and the one or more frequency channels used to transmit the data frame 314 correspond to different frequencies within the same band 303. In contrast to the implementation shown in FIG. 3A, the feedback-TXOP 315 starts after the end of the data frame preamble 312.

In some implementations, such as those shown and described with reference to FIGS. 3A and 3B, the data frame preamble covers or spans the entire portion of the frequency band occupied by both the data frames as well as the feedback channels. In some other implementations, the data frame preamble may span only those frequency channels occupied by the data frame. FIG. 3C shows feedback 356 being transmitted through a feedback channel concurrently with the transmission of a data frame 354 through one or more frequency channels within the same frequency band 313 as the feedback channel. In contrast to the implementation shown in FIGS. 3A and 3B, the data frame preamble 352 is limited to the frequency channels occupied by the data frame 354. In the implementation shown in FIG. 3C, similar to that shown in FIG. 3A, the feedback-TXOP 355 starts at the end of the data frame preamble 352 and continue until the end of the data frame 354.

FIG. 3D shows feedback 386 being transmitted through a feedback channel concurrently with the transmission of a data frame 384 through one or more frequency channels within the same frequency band 323 as the feedback channel. Similar to the implementation shown in FIG. 3C, the data frame preamble 382 is limited to the frequency channels occupied by the data frame 384. And similar to the implementation shown in FIG. 3B, the feedback-TXOP 385 starts after the end of the data frame preamble 382 and continues until the end of the data frame 384.

In many cases, data transmission may occur from a single transmitter to multiple receivers (for example, using DL MU-OFDMA/MIMO). In such cases, the feedback may be sent from each of the multiple receivers to the transmitter. In some other cases, data transmission may occur from multiple transmitters to a single receiver (for example, using UL MU-OFDMA/MIMO). Again, in such cases, there may be multiple corresponding feedback channels for transmitting feedback from the single receiver to each of the multiple transmitters. Thus, multiple feedback channels may be used in many configurations for transmission of separate feedback from a single receiver to each of the multiple transmitters or from multiple receivers to a single transmitter. In some implementations in which multiple feedback channels are used, the start time of the transmission of the feedback on the respective channels may be independent of the others.

Figure 4A:
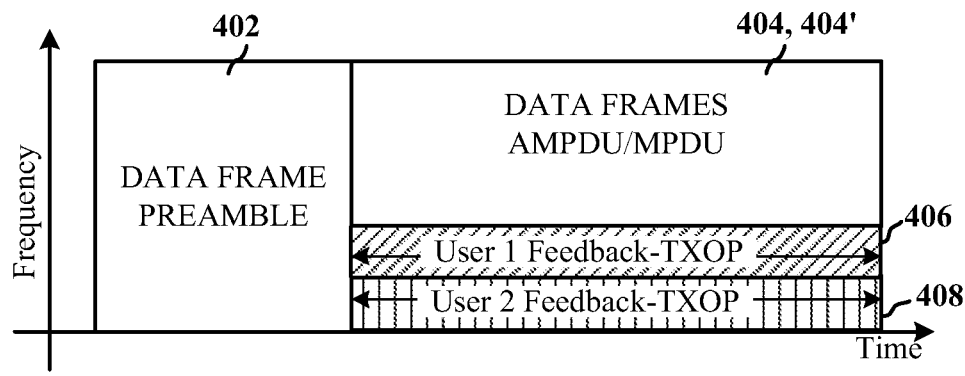
FIGS. 4A-4C illustrate examples of the use of multiple feedback channels, corresponding to multiple users, for communicating feedback in a multi-user environment according to some implementations.
Figure 4B:
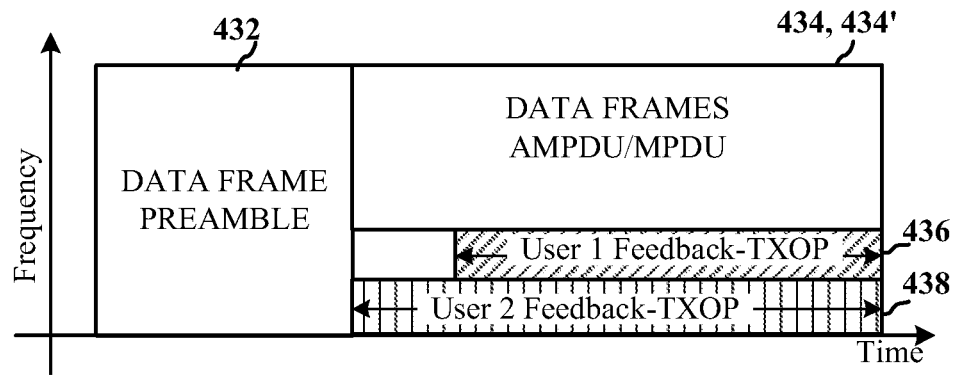
Figure 4C:
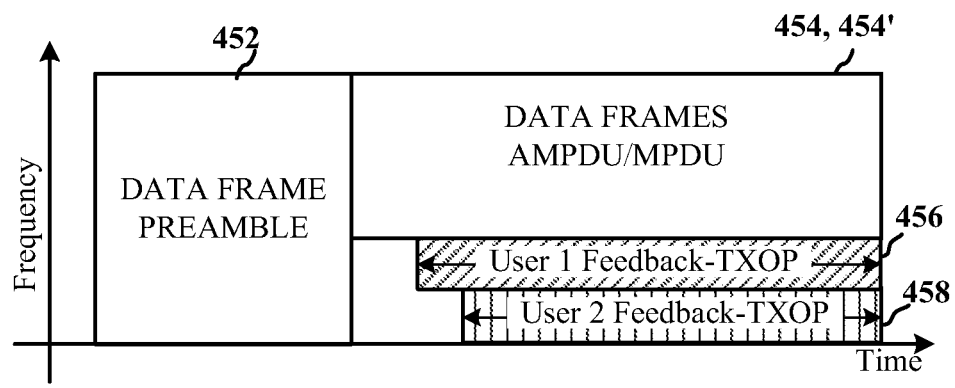

FIGS. 4A-4C illustrate examples of the use of multiple feedback channels, corresponding to multiple users, for communicating feedback in a multi-user environment according to some implementations. FIG. 4A shows a first example in which two feedback channels (and thus two feedback transmission opportunities) exist for providing feedback from two different users. In the illustrated example, a first feedback channel carries feedback 406 for a first user (user 1), and a second feedback channel carries feedback 408 for a second user (user 2). The feedback 406 and 408 and the corresponding data frames 404 and 404' may occupy different frequencies within the same frequency band. In the illustrated example, a single rectangle is shown to represent the two data frames 404 and 404'. In some implementations, the data frames 404 and 404' are transmitted using DL MU-MIMO, and as such, may occupy the same frequency band and also the same frequency channels but may be transmitted simultaneously by a transmitter (e.g., simultaneously) as spatially separate data streams. Thus the two data frames 404 and 404' may still be orthogonal in the spatial domain even though the data frames may overlap in frequency. In some other implementations, the data frames 404 and 404' are transmitted using DL MU-OFDMA, and as such, may also occupy the same frequency band and also be transmitted simultaneously but are transmitted on separate frequencies.

The first feedback 406 is transmitted via a first feedback channel corresponding to user 1, that is configured for a receiver of data frame 404 to provide feedback relating to one or more MPDUs of the data frame 404. The second feedback 408 is transmitted via a second feedback channel corresponding to user 2, that is configured for a receiver of data frame 404' to provide feedback relating to one or more MPDUs of the data frame 404'. There may be a first feedback TXOP associated with the first feedback 406 and the first feedback channel and a second feedback TXOP associated with the second feedback 408 and the second feedback channel. In the example illustrated in FIG. 4A, the first feedback-TXOP and the second feedback-TXOP begin at the same time following the data frame preamble 402 and may continue until the end of the data frames 404 and 404'.

FIG. 4B shows a second example in which two feedback channels (and thus two feedback transmission opportunities) exist for providing feedback from two different users. Similar to the implementation shown in FIG. 4A, data frames 434 and 434' may be transmitted to users 1 and 2, respectively, using DL MU-MIMO or DL MU-OFDMA. Also similar to the implementation shown in FIG. 4A, a first feedback channel may carry first feedback 436 from a first user (user 1) providing feedback relating to one or more MPDUs of the data frame 434, and a second feedback channel may carry second feedback 438 from a second user (user 2) providing feedback relating to one or more MPDUs of the data frame 434'. A first feedback TXOP is associated with the first feedback 436 and the first feedback channel and a second feedback TXOP is associated with the second feedback 438 and the second feedback channel. Unlike the example shown in FIG. 4A, in the example shown in FIG. 4B, the start times of the first and the second feedback TXOPs are different and independent. For example, the first feedback TXOP may start a fixed duration after the data frame preamble 432 and may continue until the end of the data frame 434 while the second feedback TXOP may start immediately following the data frame preamble 432 and may continue until the end of the data frame 434'.

FIG. 4C shows a third example in which two feedback channels (and thus two feedback transmission opportunities) exist for providing feedback from two different users. Similar to the implementation shown in FIGS. 4A and 4B, data frames 454 and 454' may be transmitted to users 1 and 2, respectively, using DL MU-MIMO or DL MU-OFDMA. Also similar to the implementation shown in FIGS. 4A and 4B, a first feedback channel may carry first feedback 456 from a first user (user 1) providing feedback relating to one of more MPDUs of the data frame 454, and a second feedback channel may carry second feedback 458 from a second user (user 2) providing feedback relating to one of more MPDUs of the data frame 454'. A first feedback TXOP is associated with the first feedback 456 and the first feedback channel and a second feedback TXOP is associated with the second feedback 458 and the second feedback channel. Like the example described with reference to FIG. 4B, the start times of the first and the second feedback TXOPs may be independent of one another. For example, the first feedback TXOP associated with the first feedback 456 may start after a first duration/offset from the data frame preamble 452 and may continue until the end of the data frame 454 while the second feedback TXOP may start after a second different duration/offset from the data frame preamble 452 and may continue until the end of the data frame 454'.

Figure 5:
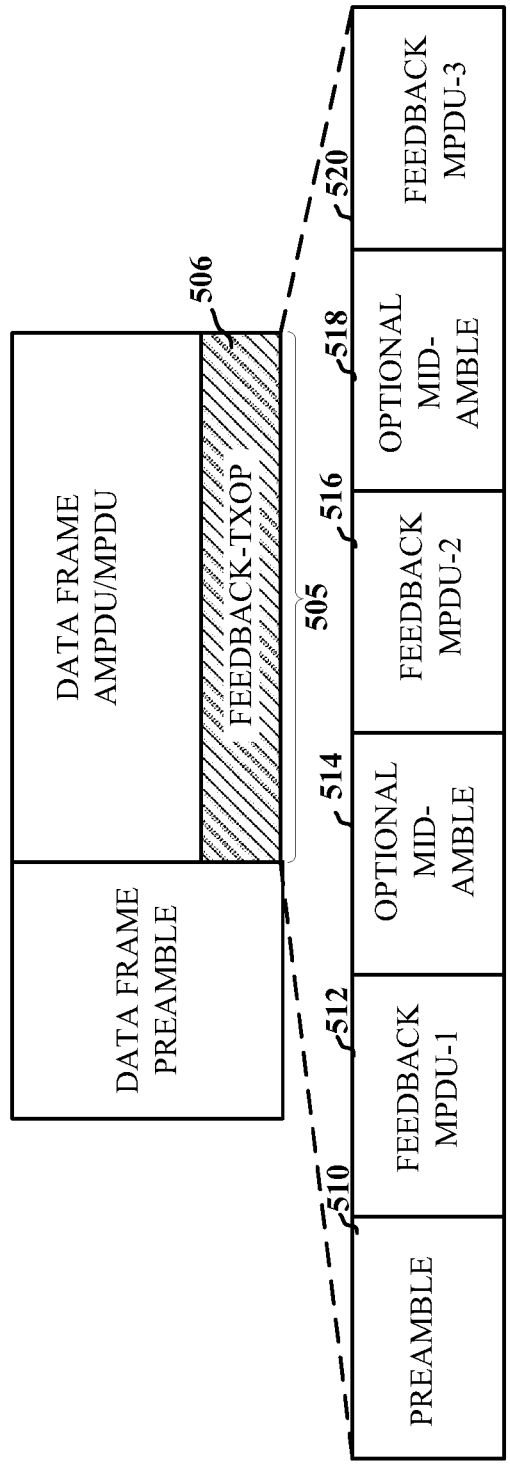
FIG. 5 shows an example of a continuous transmission of feedback information in a feedback transmission opportunity associated with a feedback channel according to some implementations.

In various aspects, feedback information may be transmitted within a feedback TXOP in a variety of ways. For example, the feedback information may be transmitted within a feedback TXOP in a continuous manner. FIG. 5 shows an example of a continuous transmission of feedback information 506 in a feedback TXOP 505 according to some implementations. The feedback TXOP 505 may include a preamble 510, a feedback MPDU-1 512 carrying feedback information, an optional mid-amble 514, a feedback MPDU-2 516 carrying feedback information, an optional mid-amble 516, and a feedback MPDU-3 520 carrying feedback information. For example, the mid-amble 514 and/or 516 may indicate (e.g., implicitly or explicitly) timing information that may allow a recipient of the feedback to check synchronization with the transmitter of the feedback and resynchronize if needed. In the example of FIG. 5, the feedback transmission may be continuous, in the feedback MPDUs 512, 516, and 520 in a sense that there may be no time gaps and/or intervals of no transmission in the feedback TXOP 505.

Figure 6:
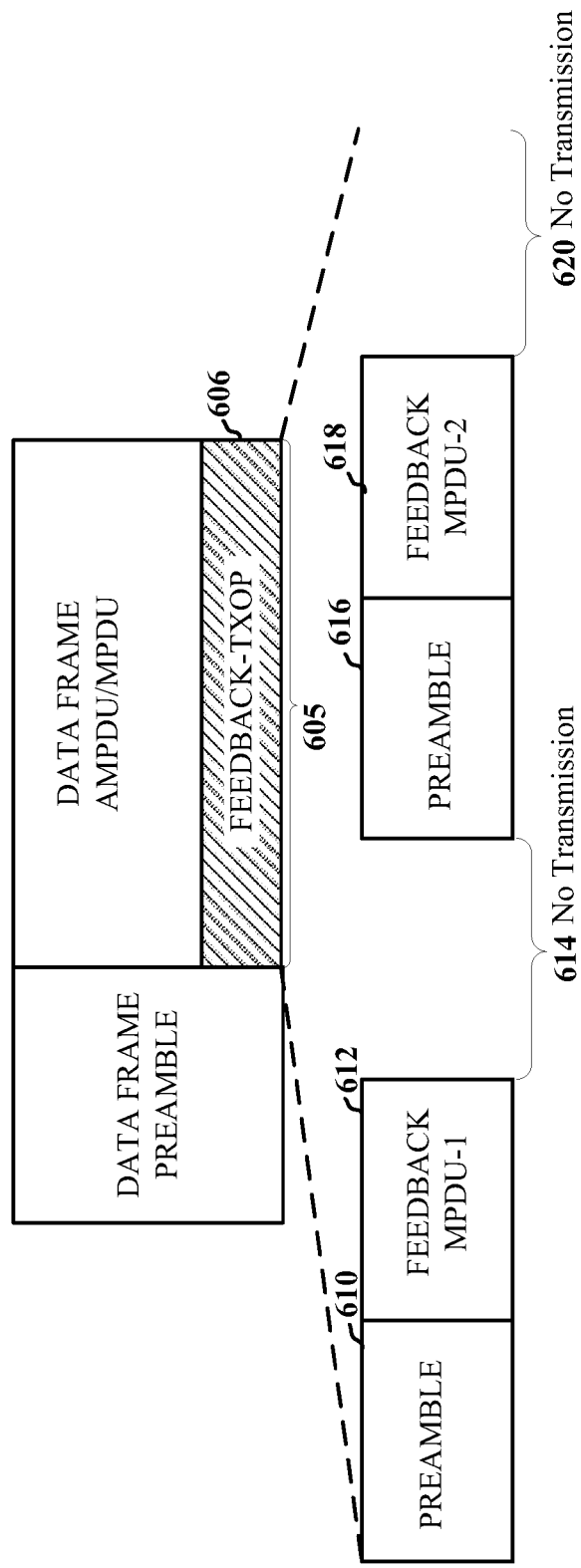
FIG. 6 shows an example of a discontinuous transmission of feedback information in a feedback transmission opportunity associated with a feedback channel according to some implementations.

FIG. 6 shows an example of a discontinuous transmission of feedback information 606 in a feedback TXOP 605 according to some implementations. The feedback TXOP 605 may include a preamble 610, a feedback MPDU-1 612 carrying feedback information, a no transmission period 614 during which no feedback information is transmitted, a preamble 616, a feedback MPDU-2 618 carrying feedback information, and another no transmission period 620 during which no feedback information is transmitted.

A feedback MPDU (as in the above examples) is an MPDU that carries feedback including information such as, for example, one or more of a suggested power to use (power control information), a suggested MCS to use, MIMO channel measurements, a symbol decode probability, an MPDU decode probability, an MPDU pass/fail indication, a preamble decode status, and an interference level, as well as in some instances no-data (padding). The feedback MPDUs may be of unequal durations in some configurations.

Figure 7:
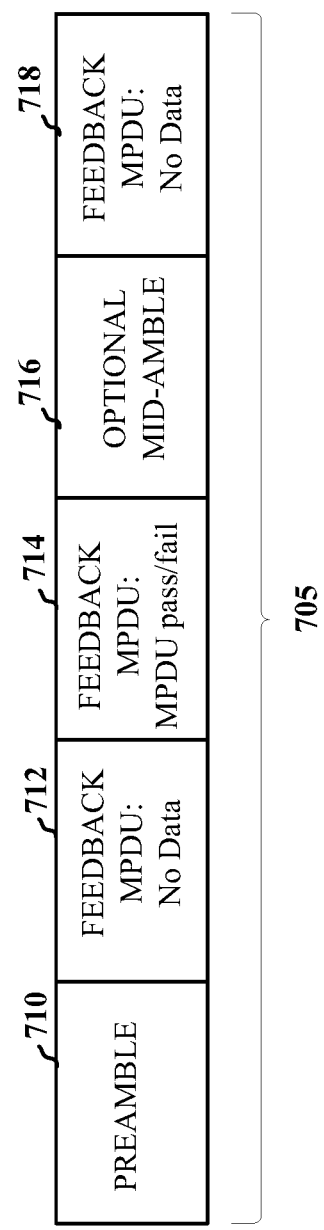
FIG. 7 shows an example of a feedback transmission opportunity during which one or more no-data feedback medium access control (MAC) protocol data units (MPDUs) may be transmitted according to some implementations.

A no-data feedback MPDU may be used in a continuous transmission case in which feedback information may be available sporadically. FIG. 7 shows an example of a feedback transmission opportunity (feedback TXOP 705) during which one or more no-data feedback MPDUs may be transmitted according to some implementations. The feedback TXOP 705 may include a preamble 710, a first no-data feedback MPDU 712, a feedback MPDU 714 carrying feedback information (for example, MPDU pass/fail information), an optional mid-amble 716, and a second no-data feedback MPDU 718. The no-data feedback MPDUs may be of variable length.

In some implementations, the resource allocation for feedback TXOPs may be performed in a static or semi-static manner. In some such implementations, during association an AP may indicate channels that may be used for feedback. In some other implementations, channel allocation for feedback may be performed before or after association through other mechanisms such as, for example, via receive operating mode indication (ROMI)/transmit operating mode indication (TOMI). For example, an AP may indicate that channels a, b, c, d are reserved for feedback during the association phase. A receiver of a single user (SU) data frame may use channel "a" to transmit feedback. Similarly, for a multi-user (MU) data frame case, for example, where multiple data frames are transmitted using OFDMA or in a MIMO fashion, the receivers of the data frames may use different channels for their respective feedback information. For example, in the case of transmission of two user data frames, two users (receivers) may use channels a and b, respectively to send their respective feedback. A similar mechanism may be followed for a multi-user case involving more than 2 users.

Figure 8:
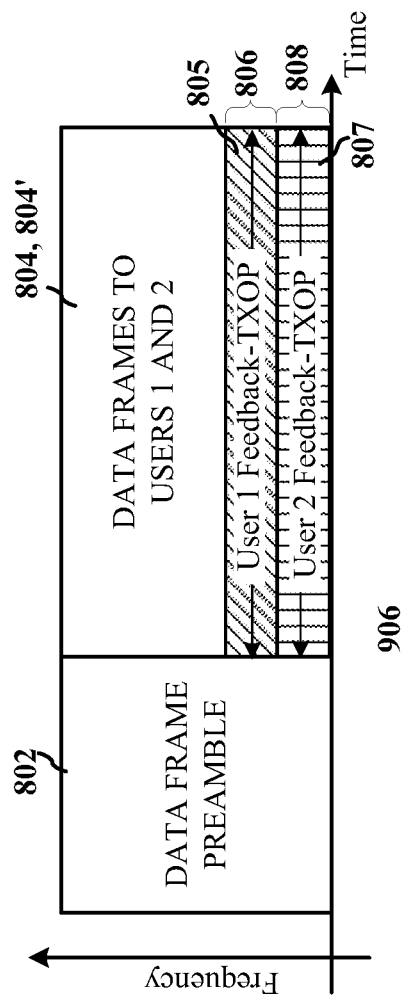
FIG. 8 shows an example of two downlink data frames and an allocation of feedback channels for the two users receiving the data frames according to some implementations.

In some other implementations, the resource allocation for feedback TXOPs may be dynamic. In such implementations, resource allocation for feedback may change (if desired or needed) from one data frame to the next data frame in a dynamic manner. For example, channel allocation for feedback may be indicated in a downlink data frame. In some such implementations, the preamble of the data frame, or one of the MPDUs in the data frame may indicate the channel or channels to be used for transmitting feedback information. FIG. 8 shows an example of two downlink data frames 804 and 804' and an allocation of feedback channels for the two users (for example, corresponding to devices) receiving the data frames according to some implementations. In this example, the data frames 804 and 804' may occupy the same frequency band and may be transmitted to users 1 and 2, respectively, using DL MU-MIMO or DL MU-OFDMA. To allow the two users to send their respective feedback information to the transmitter (for example, an AP), the transmitter may indicate that channel 806 may be used by user 1 (the receiver of data frame 804) for feedback 805 transmission and channel 808 may be used by user 2 (the receiver of data frame 804') for feedback 807 transmission. In some implementations, the indication may be provided by the transmitter in the data frame preamble 802. In some other implementations, the indication may be provided in one of the MPDUs of each of the data frames 804 and 804' so that the receiving devices may determine feedback channel allocation using the corresponding received data frames 804 and 804', respectively. In some implementations in which an MPDU in each of the data frames 804 and 804' is used to indicate the feedback channel(s) used by the respective receiving devices, the feedback TXOPs may begin after the respective MPDUs that include the indications end.

Figure 9:
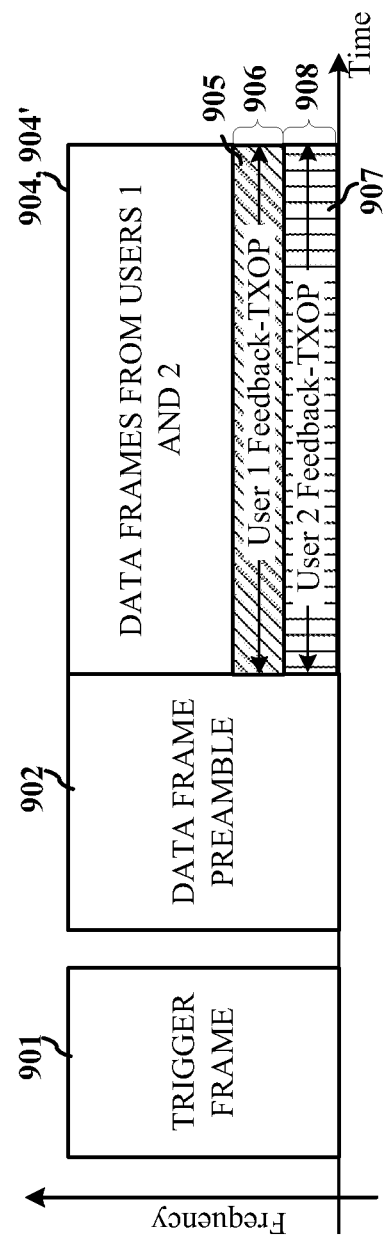
FIG. 9 shows an example of a trigger frame indicating, to one or more devices transmitting uplink data frames, an allocation of feedback channels used for feedback by a receiver of the data frames according to some implementations.

FIG. 9 shows an example of a trigger frame 901 indicating, to two devices (for example, two stations) transmitting uplink data frames 904 and 904', an allocation of feedback channels used for feedback by a receiver (for example, an AP) of the data frames according to some implementations. The receiver of the uplink data frames 904 and 904' may indicate to the first and the second transmitting users, via the trigger frame 901, the feedback channels 906 and 908 in which the receiver may transmit feedback 905 and 907 respectively to the first and the second users, respectively. With the information provided in the trigger frame 901, each of the first and the second users transmitting the uplink data frames 904 and 904', respectively, may identify the feedback channels 906 and 908 (for receiving feedback 905 and 907, respectively) that the first and second users need to decode in order to read the corresponding feedback 905 or 907 from the receiver of the uplink data frames.

A number of different types of feedback MPDUs may be provided to allow different types of feedback information to be communicated. For example, in some configurations, different types of feedback MPDUs that may be transmitted in feedback channels may include a power control feedback MPDU that may carry power control feedback, an MCS feedback MPDU that may carry MCS feedback, a MIMO channel measurement feedback MPDU that may carry MIMO channel measurements, and feedback MPDUs that may carry feedback information related to symbol decode probability, MPDU decode probability, MPDU pass/fail indication, preamble decode status, interference level, etc. Various examples of different types of feedback MPDUs are described below and shown with reference to FIGS. 10-13.

As described above, a power control feedback MPDU may carry power control feedback information. In some implementations, a power control feedback MPDU may be of two types, for example, periodic and sparse. A periodic power control feedback MPDU may be transmitted periodically and may include an indication of power control information. For example, the indication may be an up/down/hold indication that may indicate whether a transmitter should up (increase), down (decrease), or hold (maintain/leave unchanged) the transmission power used for transmission of MPDUs being transmitted by the transmitter of a data frame. The periodic power control feedback MPDUs may also indicate the increment/decrement amount or may use an amount configured by the AP.

Figure 10:
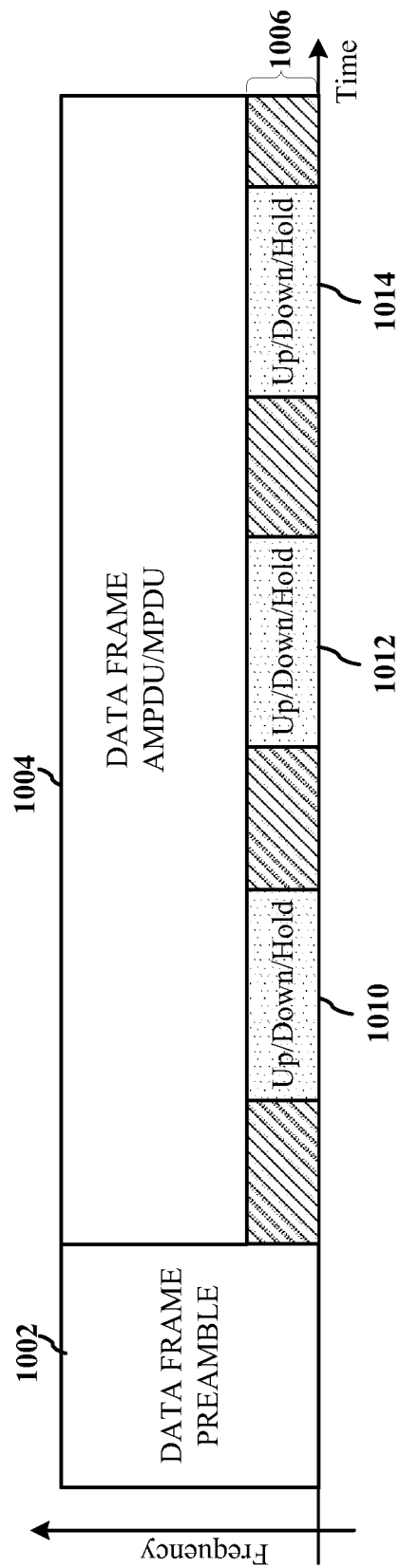
FIG. 10 shows examples of periodic power control feedback MPDUs that may be transmitted in a feedback channel according to some implementations.

FIG. 10 shows examples of periodic power control feedback MPDUs that may be transmitted in a feedback channel 1006 according to some implementations. A data frame preamble 1002 is followed by a data frame 1004. In the illustrated example, power control feedback MPDUs 1010, 1012 and 1014 are transmitted in the feedback channel 1006 during transmission of the data frame 1004. Each of the periodic power control feedback MPDUs 1010, 1012 and 1014 may indicate whether a transmitter of the data frame 1004 should increase, decrease or maintain the transmission power for the subsequent data MPDUs being transmitted in the data frame 1004.

Figure 11:
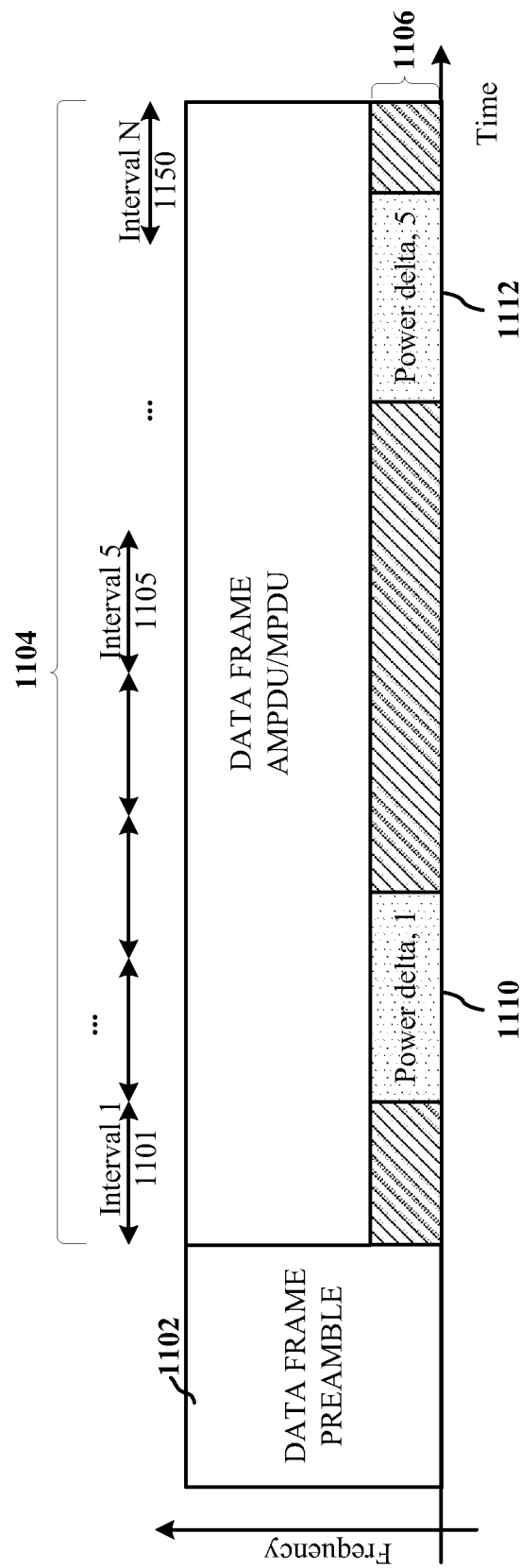
FIG. 11 shows examples of sparse power control feedback MPDUs that may be transmitted in a feedback channel according to some implementations.

FIG. 11 shows examples of sparse power control feedback MPDUs that may be transmitted in a feedback channel 1106 according to some implementations. A data frame preamble 1102 is followed by a data frame 1104. In the illustrated example, sparse power control feedback MPDUs 1110 and 1112 are transmitted in the feedback channel 1106. A sparse power control feedback MPDU provides a power delta (for example, a power difference) with respect to a reference time interval during which the receiver may perform signal measurements including power measurement. The reference time interval precedes the time period corresponding to the power control feedback MPDU, that is, the power control feedback MPDU is transmitted after the reference time interval during which the receiver performs power measurements. For example, the receiver receiving one or more MPDUs of the data frame 1104 may perform power measurements during interval 1 1101. The receiver may then determine a power delta, for example, indicating a desired change/difference in power relative to the power measured in the interval 1 1101, and transmit the first power control feedback MPDU 1110 in the feedback channel 1106 including the power delta along with information indicating the reference time interval (which in this case is interval 1 1101). Thus, two quantities or elements are transmitted in the first power control feedback MPDU 1110: a) a power delta, and b) an index of the reference time interval. For example, if the receiver desires a 5 dB increase in power with respect to the first interval 1 1101, then the power control feedback MPDU 1110 may indicate 5 dB as the power delta and indicate interval 1 1101 as the reference time interval. After the transmitter receives the power control feedback, the transmitter may change the power for one or more subsequent MPDUs of the data frame 1104 based on the power control feedback MPDU 1110. Similarly, a next power control feedback MPDU 1112 includes a power delta with respect to time interval 5 1105. In various implementations, the power control MPDUs of the type shown in FIG. 11 may be sent periodically or without any specific pattern.

In some aspects, power control feedback configuration may be performed by a transmitter of a data frame in static or dynamic manner, for example, in a manner similar to the resource allocation for feedback described and shown with reference to FIGS. 8-9. In some implementations, the attributes which may be configured by the transmitter of the data frame include: i) whether periodic or sparse power control feedback MPDU is to be sent, ii) the granularity of the time intervals used for power control feedback, iii) if periodic, the frequency of reporting of feedback, and iv) if periodic, the increment/decrement value (for example an amount by which the power is to be increased/decreased may be configured by the transmitter and the receiver may only need to indicate up/down as the feedback in the power control feedback MPDU). In various implementations, such power configuration information may be indicated during association, pre association or post association. In some implementations, such power configuration information can additionally or alternatively be communicated by the transmitter of the data frame in the data frame preamble, in one or more MPDUs, or via a trigger frame.

In some implementations, as described initially above, a receiver of a data frame may propose or request that the transmitter switch to a new MCS using a MCS type feedback MPDU. Upon receiving an MCS feedback MPDU, the data frame transmitter may switch to the suggested MCS at an earliest possible time. In some implementations, a mid-amble may be inserted to announce the change in the MCS for one or more subsequent MPDUs of the data frame.

Figure 12:
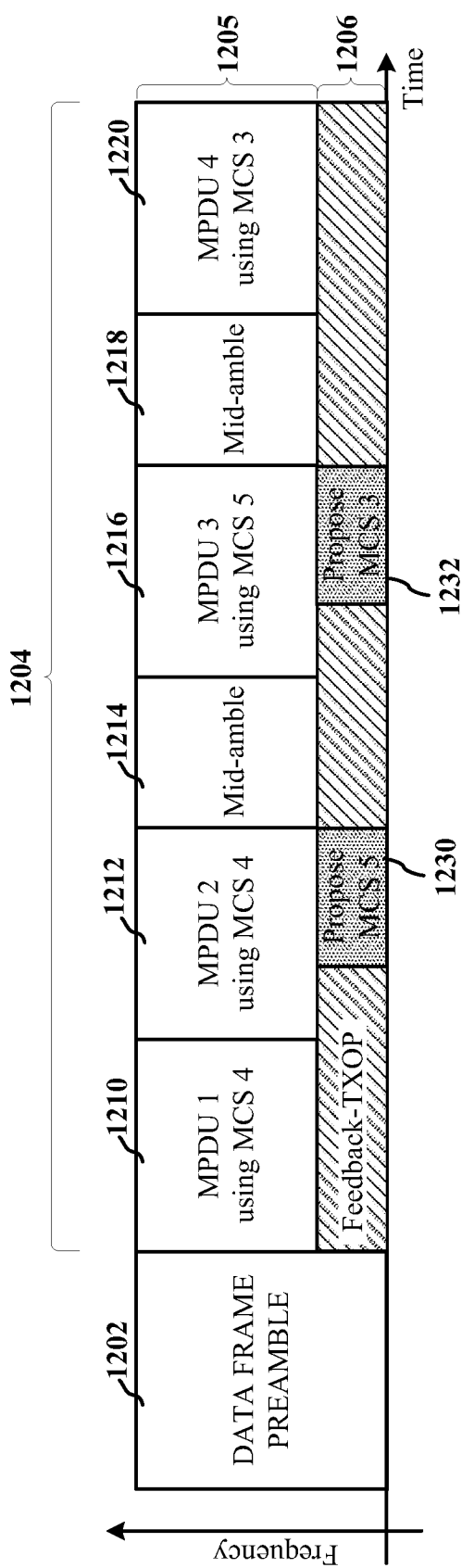
FIG. 12 shows examples of modulation and coding scheme (MCS) feedback MPDUs that may be transmitted in a feedback channel according to some implementations.

FIG. 12 shows examples of MCS feedback MPDUs that may be transmitted in a feedback channel 1206 according to some implementations. A data frame preamble 1202 is followed by a data frame 1204. In the illustrated example, MCS feedback MPDUs 1230 and 1232 are transmitted in the feedback channel 1206. As shown, MPDU 1 1210 and MPDU 2 1212 of the data frame 1204 are transmitted using MCS 4. Upon receiving the MPDU 1 1210 (and optionally a portion of MPDU 2 1212) the receiver may desire a change in the MCS. Accordingly, the receiver may transmit an MCS feedback MPDU 1230 proposing "MCS 5" requesting the transmitter to switch from MCS 4 to MCS 5. In the illustrated example, after reading the MCS feedback MPDU 1230, the transmitter of the data frame 1204 may determine to switch to the proposed MCS 5 for subsequent MPDUs. Accordingly, the transmitter inserts a mid-amble 1214 prior to the next MPDU to indicate the change in the MCS from MCS 4 to MCS 5, and then switches the MCS for the next MPDU. As shown, the next MPDU, MPDU 3 1216, of the data frame 1204 is transmitted using MCS 5. In some instances, based on the received MPDU 3 1215 the receiver may again desire a change in the MCS, for example, due to changes in conditions (for example, channel conditions, interference, etc.). For example, in the illustrated example, the receiver may transmit another MCS feedback MPDU 1232 requesting the transmitter to switch to MCS 3. After reading the MCS feedback MPDU 1232, the transmitter may determine to switch to the proposed MCS 3 for a subsequent MPDU and insert a mid-amble 1218 to indicate the change in the MCS. The transmitter may then transmit the next MPDU, MPDU 4 1220, using the new MCS 3. As just described, in some implementations, an MCS feedback MPDU may be transmitted on an as needed or as desired basis, and not necessarily in accordance with a schedule or periodicity.

Figure 13:
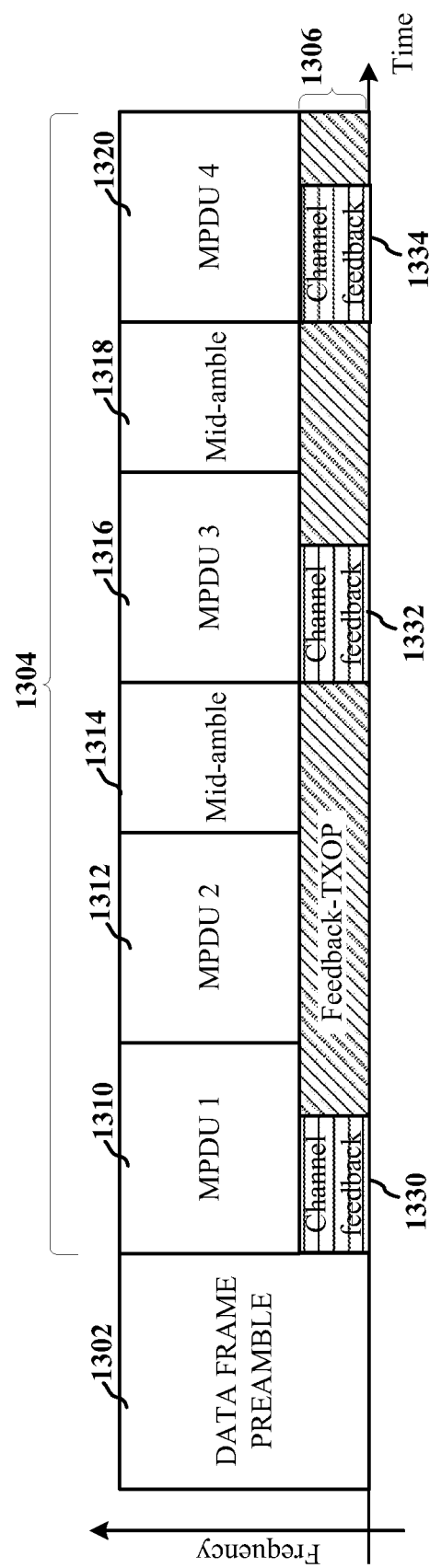
FIG. 13 shows examples of multiple-input multiple-output (MIMO) channel measurement feedback MPDUs that may be transmitted in a feedback channel according to some implementations.

FIG. 13 shows examples of MIMO channel measurement feedback MPDUs that may be transmitted in a feedback channel 1306 according to some implementations. A MIMO channel measurement feedback MPDU may be an MPDU that provides feedback information to the transmitter of a data frame related to MIMO channel measurements performed by a receiver of the data frame. A feedback MPDU of type MIMO channel measurement may be suitable and used when the data frame is a MIMO data frame (for example, either a SU-MIMO frame or MU-MIMO frame). In the example illustrated in FIG. 13, a data frame preamble 1302 is followed by a MIMO data frame 1304. Because a receiver may need to perform channel estimation, for example, to correctly decode the MPDUs of the data frame 1304 and to provide channel feedback, the data preamble 1302 is included prior to the data frame 1304 to enable the receiver to perform channel measurements. One or more transmissions in the data frame preamble 1302 may serve as a reference signal for the receiver to perform channel measurements. However, as conditions may change over time, the channel may change as well. In some implementations, to enable the receiver to perform channel measurements at later stages, the transmitter of the data frame 1304 may transmit one or more mid-ambles, such as mid-amble 1314 and mid-amble 1318, to serve as a reference signal for channel measurements by the receiver. Accordingly, using the data frame preamble 1302 and mid-ambles 1314 and 1318, the receiver may perform MIMO channel measurements and provide feedback to the transmitter. For example, based on the measurements performed using the preamble 1302, the receiver may send a MIMO channel measurement feedback MPDU 1330 providing channel feedback to the transmitter. Upon receiving the channel feedback contained in the MIMO channel measurement feedback MPDU 1330, the transmitter may update or change one or more parameters used in the MIMO transmission of the data frame 1304 (for example, antenna weight, gain, etc.). At a later stage the receiver may again perform channel measurements using the mid-amble 1314 and provide channel feedback to the transmitter via the MIMO channel measurement feedback MPDU 1332. If the transmitter desires to further obtain channel feedback again, the transmitter may insert the mid-amble 1318 in the data frame 1304. The transmitter may insert the mid-ambles when feedback is desired or to allow the receiver to send feedback if appropriate. In a similar manner as discussed above, the receiver may again perform channel measurements using the mid-amble 1318 as a reference signal and provide channel feedback to the transmitter by sending the MIMO channel measurement feedback MPDU 1334. Upon receiving the channel feedback, the transmitter may determine if there is a need to change or update one or more parameters used in the MIMO transmission, and if so, the transmitter may change or update the one or more parameters based on the feedback received in the feedback MPDU 1334.

In some implementations, the transmitter of a MIMO data frame may provide a MIMO channel measurement configuration to the receiver indicating whether the preamble should be used for channel estimation purposes and for providing feedback based on the channel estimates. Additionally or alternatively, the transmitter of a MIMO data frame may signal a MIMO channel measurement configuration to the receiver indicating one or more mid-ambles to be used for channel estimation purposes and for providing feedback. In some such implementations, each preamble or mid-amble of a MIMO data frame may indicate whether the receiver should use the preamble or mid-amble, respectively, for channel estimation and to provide feedback relating to the corresponding MIMO channel measurements to the transmitter.

Figure 14:
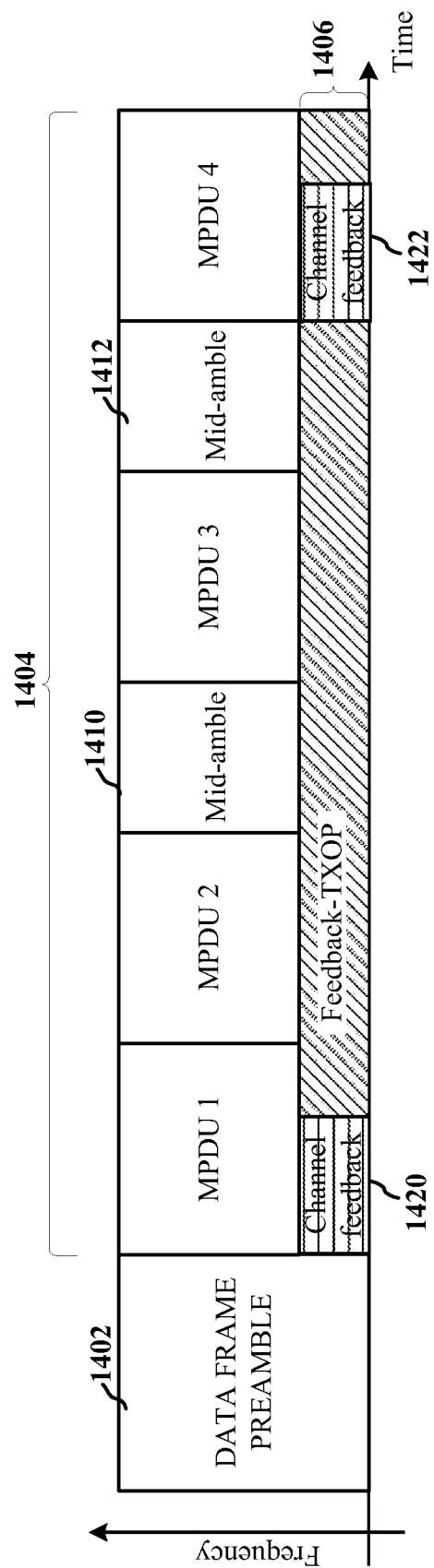
FIG. 14 shows examples of MIMO channel measurement feedback MPDUs that may be transmitted in a feedback channel according to some implementations.

FIG. 14 shows examples of MIMO channel measurement feedback MPDUs that may be transmitted in a feedback channel according to some implementations. In the example illustrated in FIG. 14, the transmitter may configure the MIMO channel measurements to be performed using the preamble 1402 and the last mid-amble 1412 of the data frame 1404. As illustrated, while the MIMO data frame 1404 includes two mid-ambles 1410 and 1412 in this example, the transmitter may instruct that MIMO channel measurements be performed only using the preamble 1402 and the last mid-amble 1412. Thus, in this example only the preamble 1402 and the last mid-amble 1412 may indicate that the receiver should perform channel measurements using the preamble 1402 and the mid-amble 1412. Accordingly, the receiver may perform channel measurements using the preamble 1402 as a reference signal, and send the MIMO channel measurement feedback MPDU 1420 providing the channel measurement/estimation feedback. Similarly, upon reading the mid-amble 1412, the receiver may perform channel measurements using the mid-amble 1412 as a reference signal and send the MIMO channel measurement feedback MPDU 1422 providing the channel measurement/estimation feedback to the transmitter. In this example, no channel measurements are performed using the mid-amble 1410 because no indication for performing channel measurements using the mid-amble 1410 is provided by the transmitter in the mid-amble.

Configuration mechanisms for various other types of feedback MPDUs may be similar to the mechanisms described above. For example, a configuration relating to one or more of the various other types of feedback MPDUs (for example, feedback MPDUs conveying symbol decode probability, MPDU decode probability, MPDU pass/fail indication, preamble decode status, interference level, etc.) may be performed during association or post-association (for example, through ROMI/TOMI mechanisms) if the configuration is done in a static/semi-static manner. In various other embodiments, the configuration relating to feedback MPDUs may also be done dynamically by transmitting the configuration information in the preamble/trigger frame/mid-amble of the data frame as discussed supra.

In an aspect, during association, a node (e.g., transmitter and/or receiver) may indicate whether the node is capable of sending and/or receiving feedback. In some implementations, such information exchanged during the association may be used when configuring the feedback channel for a node.

In an aspect, when a receiver is configured to transmit feedback continuously within a feedback TXOP, the transmitter may monitor the feedback channel during the feedback TXOP and if the feedback is not detected within a certain threshold duration (e.g., predetermined or dynamically selected threshold time duration), the transmitter may abort the transmission of the data frame and/or transmission of remaining data frame MPDUs in the data frame to be transmitted. For example, in one configuration, in response to a first MPDU of a plurality of MPDUs of a data frame transmitted by the transmitter via a data channel, the transmitter may be expecting feedback within a threshold time duration during the feedback TXOP. If the transmitter determines that a feedback MPDU is not received within the threshold time duration in response to the transmitted first MPDU, the transmitter may decide to abort transmission of the remaining MPDUs of the data frame and yield/give up the data channel to allow other devices to transmit their respective data frames. Such an approach may allow an efficient utilization of the data channel and avoid wasteful transmission of data frame MPDUs when feedback for at least some initially transmitted feedback is not received.

Figure 15:
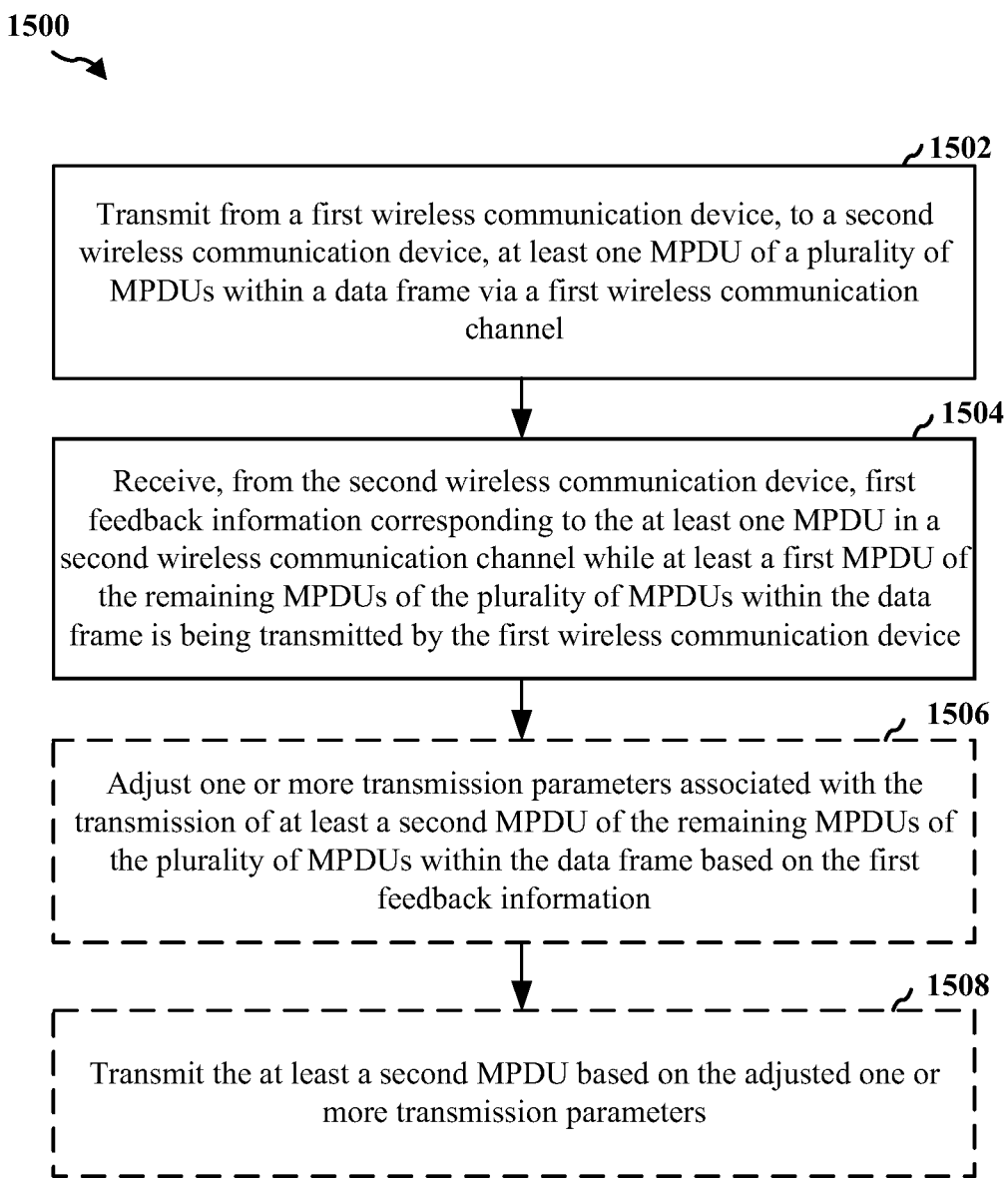
FIG. 15 is a flowchart showing an example process for wireless communication according to some implementations.

FIG. 15 is a flowchart showing an example process 1500 for wireless communication according to some implementations. The process 1500 may be performed by a first wireless communication device, for example, a transmitter of a data frame such as an access point (for example, AP 104) or a station (for example, station 114 or any of the other client devices shown in FIG. 1).

At 1502, the first wireless communication device may transmit at least one MPDU of a plurality of MPDUs within a data frame via first wireless communication channel to the second wireless communication device. For example, referring to FIG. 12, the data frame being transmitted may be the data frame 1204 including a plurality of MPDUs (e.g., MPDUs 1210, 1212, 1216 and 1220). In this example, the at least one MPDU of the plurality of MPDUs may correspond to MPDU 1 1210 transmitted via the channel 1205. In one example, the at least one MPDU of the plurality of MPDUs may also include a the MPDU 2 1212 or a portion thereof. While discussed above as being transmitted to the second wireless communication device, the data frame may be transmitted (e.g., broadcast) to a plurality of wireless communication devices including the second wireless communication device.

At 1504, the first wireless communication device may receive, from the second wireless communication device, first feedback information corresponding to the at least one MPDU in a second wireless communication channel (e.g., a feedback channel) while at least a first MPDU of the remaining MPDUs of the plurality of MPDUs within the data frame is being transmitted by the first wireless communication device. In some configurations, the first MPDU of the remaining MPDUs within the data frame may be transmitted via the first wireless communication channel. For example, referring to FIG. 12, the first wireless communication device (e.g., transmitter of the data frame 1204) may receive the first feedback information, e.g., a feedback MPDU 1230, providing feedback corresponding to the at least one MPDU from the second wireless communication device (e.g., receiver of the MPDUs) in the feedback channel 1206 while another MPDU (e.g., MPDU 1212) of the data frame 1204 is being transmitted by the first wireless communication device.

At 1506, following receipt of the first feedback information, the first wireless communication device may adjust one or more transmission parameters associated with the transmission of at least a second MPDU of the remaining MPDUs of the plurality of MPDUs within the data frame based on the first feedback information. The one or more adjusted transmission parameters may be different than corresponding transmission parameters used by the first wireless communication device to transmit the at least one MPDU. In some configurations, the one or more adjusted transmission parameters may comprise, for example, at least one of an MCS, a transmission power, or a transmission rate. For example, with reference to FIG. 12, based on the received feedback information, the first wireless communication device may adjust the MCS for one or more subsequent MPDUs to MCS 5.

At 1508, the first wireless communication device may transmit at least a second MPDU of the remaining MPDUs of the plurality of MPDUs within the data frame based on the adjusted one or more transmission, e.g., adjusted based on the first feedback information as discussed above. Referring again to FIG. 12 as an example, the at least second MPDU of the remaining MPDUs of the data frame may include MPDU 3 1216 which may be transmitted based on an adjusted MCS (e.g., MCS 5) that is adjusted from a previously used MCS (e.g., MCS 4) based on the first feedback information received in the feedback MPDU 1230. In some configurations, the at least second MPDU may be transmitted via the first wireless communication channel or another different communication channel. For example, a different communication channel (e.g., different than the first wireless communication channel) may be used to support transmission of the at least second MPDU based on the adjusted one or more transmission parameters in a case where the first wireless communication channel may not be suitable for transmission of the at least second MPDU due to modified/adjusted one or more transmission parameters.

Figure 16:
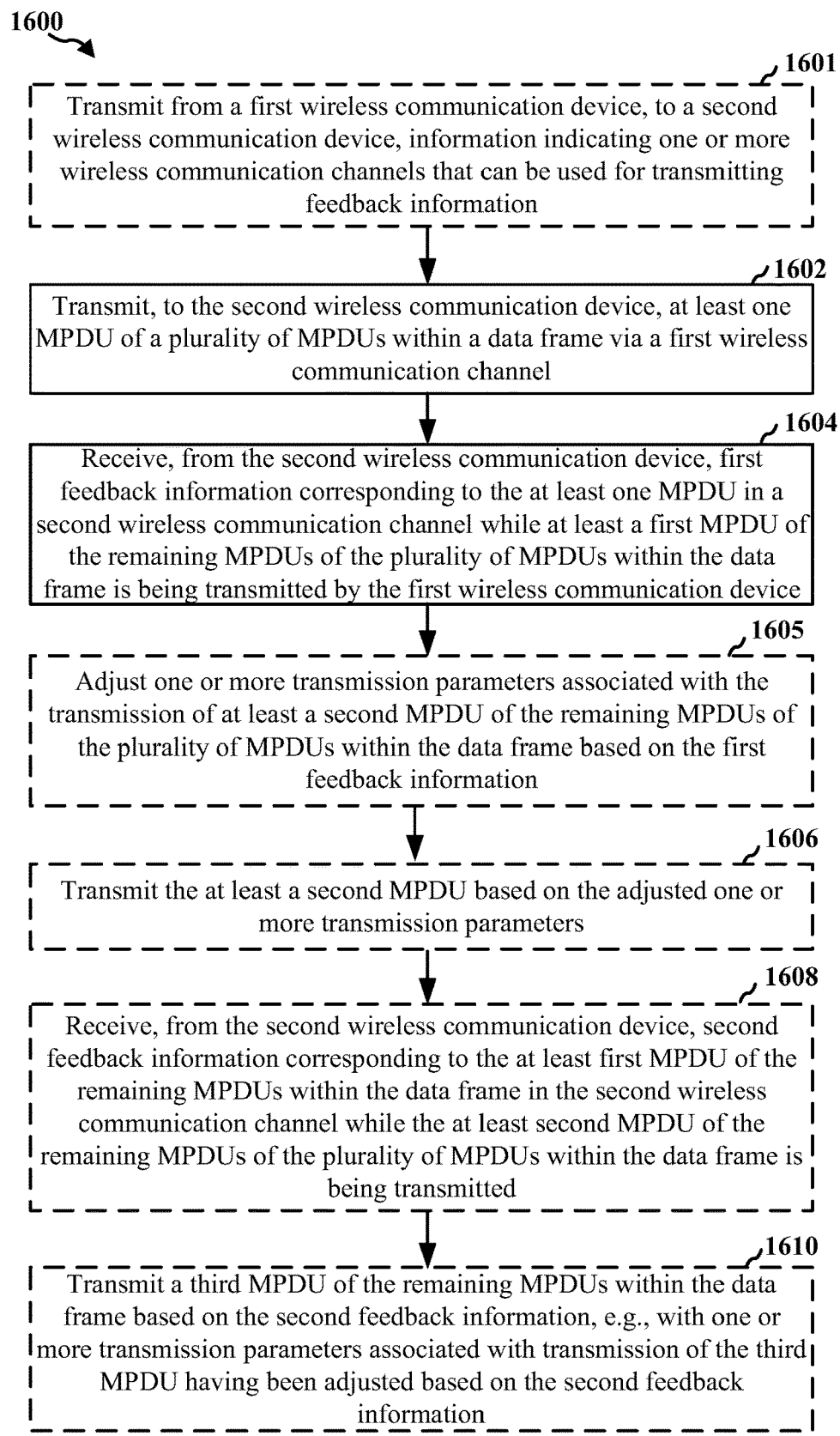
FIG. 16 is a flowchart showing an example process for wireless communication according to some implementations.

FIG. 16 is a flowchart showing an example process 1600 for wireless communication according to some implementations. The process 1600 may be performed by a first wireless communication device, for example, a transmitter of a data frame such as an access point (for example, AP 104) or a station (for example, station 114 or any of the other client devices shown in FIG. 1).

At 1601, the first wireless communication device may optionally transmit to a second wireless communication device (e.g., an intended receiver of a data frame), information indicating one or more wireless communication channels that can be used for transmitting feedback information to the first wireless communication device. For example, the first wireless communication device may provide feedback resource allocation, to intended recipient(s) of the data frame from the first wireless communication device, indicating one or more feedback channels that may be used to provide feedback. In accordance with an aspect, the second wireless communication device may use at least one of the one or more wireless communication channels to provide feedback in response to an MPDU of the data frame that the second wireless communication device may receive from the first wireless communication device.

At 1602, the first wireless communication device may transmit at least one MPDU of a plurality of MPDUs within a data frame via first wireless communication channel to the second wireless communication device. For example, referring to FIG. 12, the data frame being transmitted may be the data frame 1204 including a plurality of MPDUs (e.g., MPDUs 1210, 1212, 1216 and 1220). In this example, the at least one MPDU of the plurality of MPDUs may correspond to MPDU 1 1210 transmitted via the channel 1205. In one example, the at least one MPDU of the plurality of MPDUs may also include a the MPDU 2 1212 or a portion thereof. While discussed above as being transmitted to the second wireless communication device, the data frame may be transmitted (e.g., broadcast) to a plurality of wireless communication devices including the second wireless communication device.

At 1604, the first wireless communication device may receive, from the second wireless communication device, first feedback information corresponding to the at least one MPDU in a second wireless communication channel (e.g., a feedback channel) while at least a first MPDU of the remaining MPDUs of the plurality of MPDUs within the data frame is being transmitted by the first wireless communication device. In some configurations, the first MPDU of the remaining MPDUs within the data frame may be transmitted via the first wireless communication channel. Again referring to FIG. 12 as an example, the first wireless communication device (e.g., transmitter of the data frame 1204) may receive the first feedback information, e.g., a feedback MPDU 1230, providing feedback corresponding to the at least one MPDU from the second wireless communication device (e.g., receiver of the MPDUs) in the feedback channel 1206 while another MPDU (e.g., MPDU 1212) of the data frame 1204 is being transmitted by the first wireless communication device. As illustrated in FIGS. 3-14 and discussed in detail above, in various configurations the data frame transmission and receipt of feedback in a feedback channel may (at least partially) overlap in time and thus the feedback may be received by the first wireless communication device while the data frame is still being transmitted, e.g., while one or more MPDUs (after the at least one MPDU corresponding to which feedback is received) are being transmitted. Thus, it may be appreciated that unlike previous 802.11 systems, the feedback may be received on the fly while the data frame is being transmitted because of a separate feedback channel which may be active (for transmission of feedback from the receiver) during the time period of data frame transmission. In an aspect, the first feedback information may include at least one of: power control information, MCS, MIMO channel measurements, symbol decoding probability, MPDU decoding probability, MPDU pass/fail indication, preamble decoding status, interference level, or no-data. In the particular example of FIG. 12, the first feedback information in the feedback MPDU 1230 may be, e.g., a proposed MCS, for use in transmission of the next one or more MPDUs of the data frame 1204. In some configurations, the first wireless communication device may allocate (e.g., in a static/semi-static or dynamic manner) resources, e.g., the one or more channels, to the second wireless communication device for sending the feedback. For example, as discussed supra in connection with block 1601, in one configuration, the first wireless communication device may communicate, to the second wireless communication device, resource allocation information indicating one or more channels which may be used for sending the feedback information. In such a configuration, the second wireless communication channel (e.g., the feedback channel) may be one of the one or more allocated channels.

Following receipt of the first feedback information, the first wireless communication device may decide to perform adjustments of one or more parameters (for example, transmission parameters) based on the received feedback. Accordingly, at 1605, the first wireless communication device may adjust one or more transmission parameters associated with the transmission of at least a second MPDU of the remaining MPDUs of the plurality of MPDUs within the data frame based on the first feedback information. The one or more adjusted transmission parameters may be different than corresponding transmission parameters used by the first wireless communication device to transmit the at least one MPDU. In some configurations, the one or more adjusted transmission parameters may comprise, for example, at least one of an MCS, a transmission power, or a transmission rate. For example, with reference to FIG. 12, based on the received feedback information, the first wireless communication device may adjust the MCS for one or more subsequent MPDUs to MCS 5.

At 1606, the first wireless communication device may transmit at least a second MPDU of the remaining MPDUs of the plurality of MPDUs within the data frame based on the adjusted one or more transmission, e.g., adjusted based on the first feedback information as discussed above. Referring again to FIG. 12 as an example, the at least second MPDU of the remaining MPDUs of the data frame may include MPDU 3 1216 which may be transmitted based on an adjusted MCS (e.g., MCS 5) that is adjusted from a previously used MCS (e.g., MCS 4) based on the first feedback information received in the feedback MPDU 1230. In some configurations, the at least second MPDU may be transmitted via the first wireless communication channel or another different communication channel. For example, a different communication channel (e.g., different than the first wireless communication channel) may be used to support transmission of the at least second MPDU based on the adjusted one or more transmission parameters in a case where the first wireless communication channel may not be suitable for transmission of the at least second MPDU due to modified/adjusted one or more transmission parameters.

At 1608, the first wireless communication device may receive, from the second wireless communication device, second feedback information corresponding to the at least first MPDU of the remaining MPDUs within the data frame in the second wireless communication channel while the at least second MPDU of the remaining MPDUs of the plurality of MPDUs within the data frame is being transmitted. For example, with reference to FIG. 12, the second feedback information may be received in the feedback MPDU 1232 in the feedback channel 1206 which may provide feedback corresponding to MPDU 2 1212, e.g., the at least first MPDU of the remaining MPDUs of the data frame in the data frame 1204. Again, following receipt of the second feedback information, the first wireless communication device may decide to perform adjustments, e.g., in the MCS and/or one or more other parameters, based on the received second feedback information.

At 1610, the first wireless communication device may transmit a third MPDU (e.g., MPDU 4 1220) of the remaining MPDUs of the plurality of MPDUs within the data frame 1204 based on the received second feedback information (e.g., feedback in feedback MPDU 1232). Prior to transmission of the third MPDU, the first wireless communication device may adjust one or more transmission parameters associated with the transmission of the third MPDU within the data frame based on the second feedback information in a similar manner as discussed with respect to block 1605.

As discussed supra, in some configurations, the first wireless communication channel may correspond to a first sub-band of a frequency band and the second wireless communication channel may correspond to a second non-overlapping sub-band of the frequency band. In some other configurations, the first wireless communication channel may correspond to a first frequency band and the second wireless communication channel may correspond to a second non-overlapping frequency band. In some configurations, the second wireless communication channel may be one of a plurality of feedback channels. In one such configuration, each feedback channel of the plurality of feedback channels may correspond to a different respective wireless communication device of a plurality of different devices, and the second wireless communication device may be one of the plurality of different devices. Each feedback channel may be for receiving feedback information from the respective wireless communication device.

Figure 17:
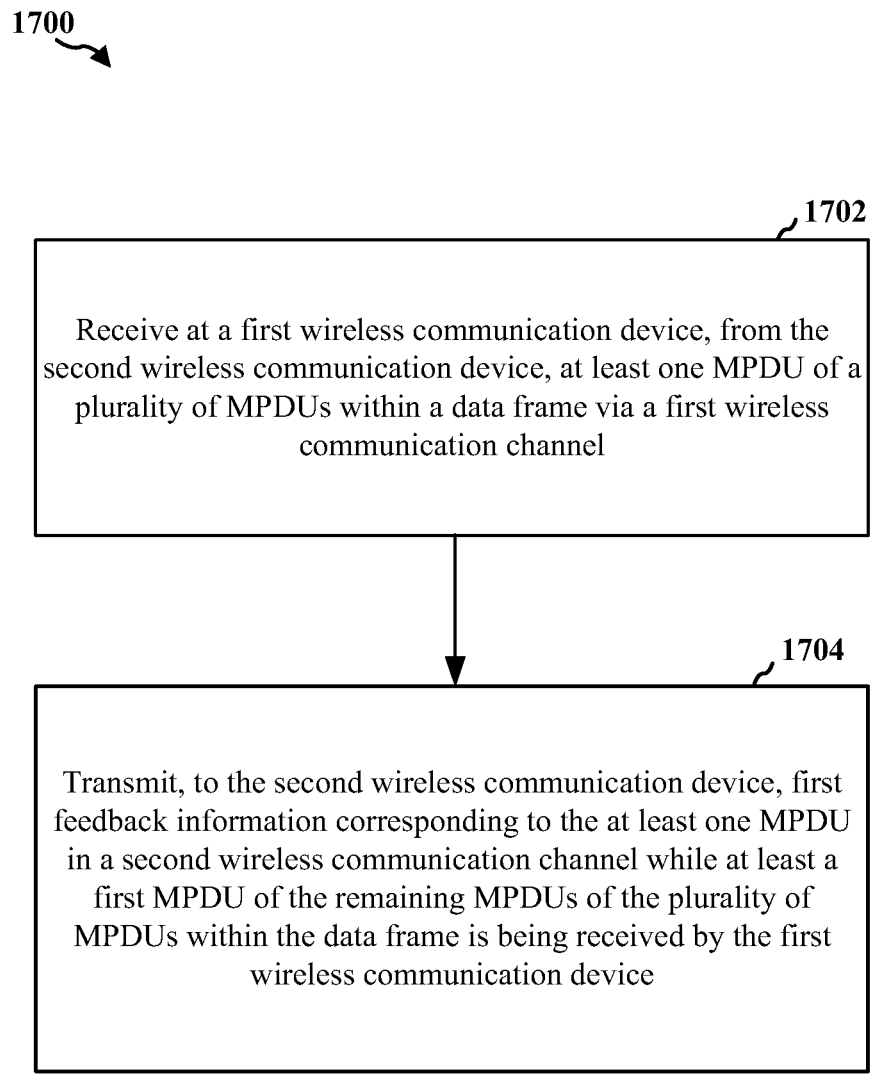
FIG. 17 is a flowchart showing an example process for wireless communication according to some implementations.

FIG. 17 is a flowchart showing an example process 1700 for wireless communication according to some implementations. The process 1700 may be performed by a first wireless communication device, for example, a receiver of a data frame such as a station (for example, station 114 or any of the other client devices shown in FIG. 1) or an access point (for example, AP 104).

At 1702, the first wireless communication device may receive, from a second wireless communication device, at least one MPDU of a plurality of MPDUs within a data frame via a first wireless communication channel. The second wireless communication device may be the transmitter of the data frame. For example, referring to FIG. 12, the at least one MPDU being received may be associated with the data frame 1204 including the set of MPDUs (e.g., MPDUs 1210, 1212, 1216 and 1220). For example, the received the at least one MPDU of the plurality of MPDUs within the data frame 1204 may comprise MPDU 1 1210 received via the wireless channel 1205. In some examples, the received the at least one MPDU may also include the MPDU 2 1212 or a portion thereof.

In accordance with an aspect, upon receipt of the at least one MPDU of the data frame 1204, the first wireless communication device may determine to send back a feedback corresponding to the received at least one MPDU. For example, the feedback may indicate whether adjustment/modification to one or more transmission parameters for transmission of a subsequent MPDU is desired by the receiver (the first wireless communication device).

At 1704, the first wireless communication device may transmit, to the second wireless communication device, first feedback information corresponding to the at least one MPDU of the plurality of MPDUs in a second wireless communication channel while at least a first MPDU of the remaining MPDUs of the plurality of MPDUs within the data frame is being received by the first wireless communication device. The first MPDU may be received via the first wireless communication channel or another different channel Again referring to FIG. 12 as an example, the first wireless communication device may transmit the first feedback information, e.g., feedback MPDU 1230, providing feedback corresponding to the at least one MPDU (e.g., MPDU 1210) of the set of MPDUs to the second wireless communication device in the feedback channel 1206 (e.g., the second wireless communication channel) while one or more of the remaining MPDUs (e.g., such as MPDU 2 1212 or a portion thereof) within the data frame 1204 is being received.

Figure 18:
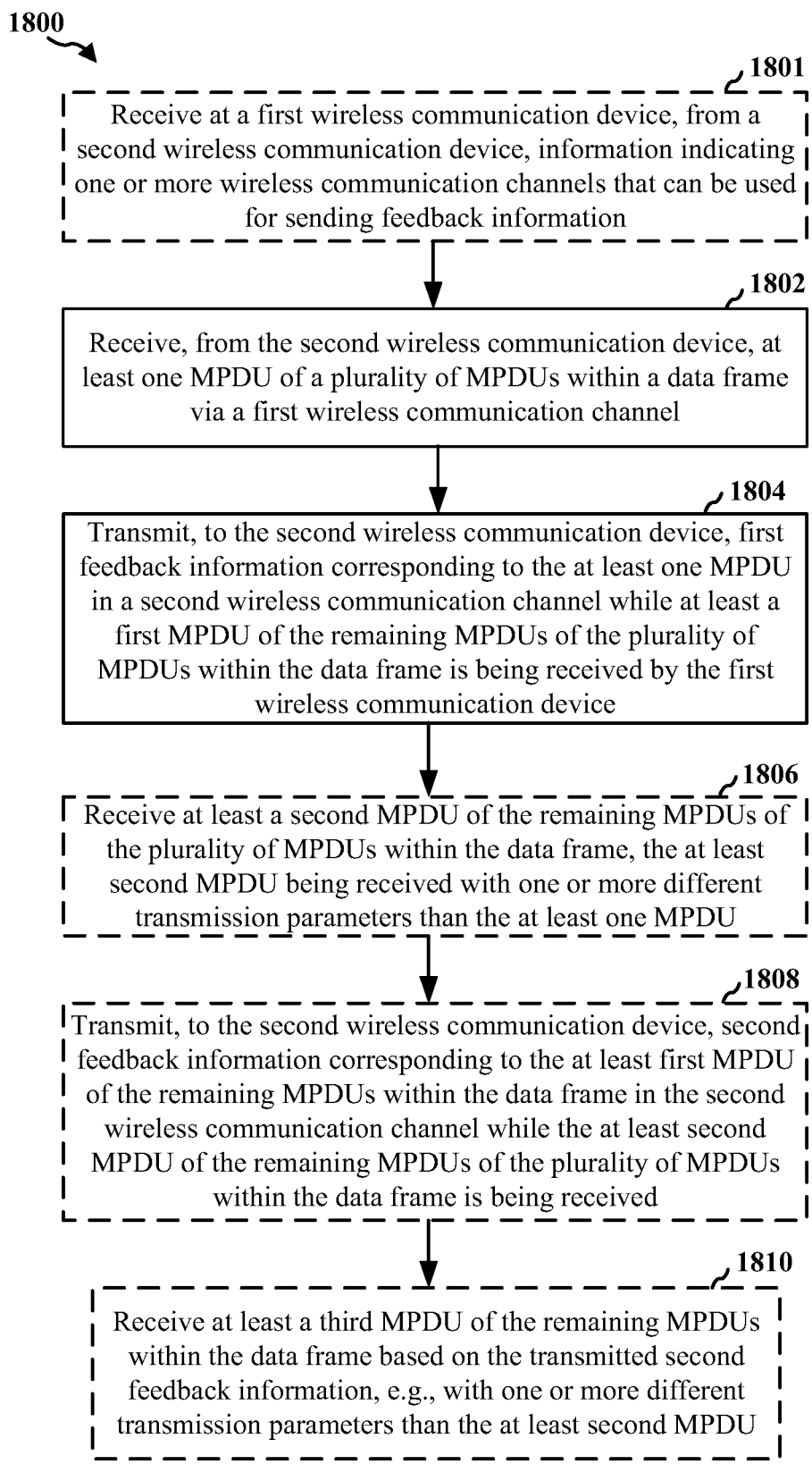
FIG. 18 is a flowchart showing an example process for wireless communication according to some implementations.

FIG. 18 is a flowchart showing an example process 1800 for wireless communication according to some implementations. The process 1800 may be performed by a first wireless communication device, for example, a receiver of a data frame such as a station (for example, station 114 or any of the other client devices shown in FIG. 1) or an access point (for example, AP 104).

At 1801, the first wireless communication device may receive from a second wireless communication device (e.g., a transmitter of a data frame), information indicating one or more wireless communication channels that may be used for sending feedback information to the first wireless communication device. For example, the second wireless communication device may provide feedback resource allocation, to intended recipient(s) of the data frame (including the first wireless communication device), indicating one or more feedback channels that may be used to provide feedback. In accordance with an aspect, the first wireless communication device may use at least one of the one or more wireless communication channels to provide feedback in response to an MPDU of the data frame that the first wireless communication device may receive from the second wireless communication device.

At 1802, the first wireless communication device may receive, from a second wireless communication device, at least one MPDU of a plurality of MPDUs within a data frame via a first wireless communication channel. The second wireless communication device may be the transmitter of the data frame. For example, referring to FIG. 12, the at least one MPDU being received may be associated with the data frame 1204 including the set of MPDUs (e.g., MPDUs 1210, 1212, 1216 and 1220). For example, the received the at least one MPDU of the plurality of MPDUs within the data frame 1204 may comprise MPDU 1 1210 received via the wireless channel 1205. In some examples, the received the at least one MPDU may also include the MPDU 2 1212 or a portion thereof.

In accordance with an aspect, upon receipt of the at least one MPDU of the data frame 1204, the first wireless communication device may determine to send back a feedback corresponding to the received at least one MPDU. For example, the feedback may indicate whether adjustment/modification to one or more transmission parameters for transmission of a subsequent MPDU is desired by the receiver (the first wireless communication device).

At 1804, the first wireless communication device may transmit, to the second wireless communication device, first feedback information corresponding to the at least one MPDU of the plurality of MPDUs in a second wireless communication channel while at least a first MPDU of the remaining MPDUs of the plurality of MPDUs within the data frame is being received by the first wireless communication device. The first MPDU may be received via the first wireless communication channel or another different channel Again referring to FIG. 12 as an example, the first wireless communication device may transmit the first feedback information, e.g., feedback MPDU 1230, providing feedback corresponding to the at least one MPDU (e.g., MPDU 1210) of the set of MPDUs to the second wireless communication device in the feedback channel 1206 (e.g., the second wireless communication channel) while one or more of the remaining MPDUs (e.g., such as MPDU 2 1212 or a portion thereof) within the data frame 1204 is being received. Thus, feedback may be transmitted by the first wireless communication device (receiver of the data frame) while the data frame is still being received.

In an aspect, the first feedback information may include at least one of: power control information, MCS, MIMO channel measurements, symbol decoding probability, MPDU decoding probability, MPDU pass/fail indication, preamble decoding status, interference level, or no-data. In the particular example of FIG. 12, the transmitted first feedback information in the feedback MPDU 1230 may be a proposed MCS for consideration/use by the second wireless communication device in the transmission of the next one or more MPDUs of the data frame 1204. In some configurations, the first wireless communication device may receive a resource allocation, e.g., indicating one or more channels allocated for sending feedback to the second wireless communication device. For example, as discussed supra in connection with block 1801, in one configuration, the first wireless communication device may receive, from the second device, information indicating one or more channels which may be used for sending the feedback information (e.g., feedback corresponding to the received at least one MPDU and/or other MPDUs of the data frame 1204) to the second wireless communication device. The second wireless communication channel may be one of the one or more allocated channels. In some configurations, the information indicating the one or more channels which may be used for sending the feedback information may be received before, during, or after an association process. In some other configurations, the indication of allocation may be received in a dynamic manner, e.g., in a preamble of the data frame, in one or more MPDUs of the data frame, and/or in a trigger frame.

Following receipt of the first feedback information, the second wireless communication device (e.g., transmitter of data frame that may receive the feedback) may decide to perform adjustments of one or more parameters (e.g., transmission parameters) based on the feedback provided by the first wireless communication device. At 1806, the first wireless communication device may receive at least a second MPDU of the remaining MPDUs within the data frame, where the at least second MPDU may be received with one or more different transmission parameters than the at least one MPDU. For example, the at least second MPDU may be received with one or more different transmission parameters (such as at an MCS, a transmission power, a transmission rate, etc.) than transmission parameter(s) associated with the at least one MPDU received earlier. The difference in the one or more transmission parameters may be due to adjustments to the transmission parameter(s) associated with the at least one MPDU based on the transmitted first feedback information. Referring again to FIG. 12 as an example, the at least second MPDU may include the MPDU 3 1216, which may be received by the first wireless communication device. In the example, the MPDU 3 1216 received by the first wireless communication device may be based on the feedback information (e.g., MCS 5) provided by the first wireless communication device in the feedback MPDU 1230. In this example, the adjusted transmission parameter used for transmission of the at least second MPDU may be the MCS that may have been adjusted/modified by the transmitter of data (the second wireless communication device) based on the first feedback information. In some configurations, the at least second MPDU may be received via the first wireless communication channel. In some configurations, the at least second MPDU may be received via the first wireless communication channel or another different communication channel. For example, a different communication channel (e.g., different than the first wireless communication channel) may be used by the second wireless communication device to transmit the at least second MPDU to the first wireless communication device based on the adjusted one or more transmission parameters in a case where the first wireless communication channel may not be suitable for transmission of the at least second MPDU due to modified/adjusted one or more transmission parameters.

At 1808, the first wireless communication device may transmit, to the second wireless communication device, second feedback information corresponding to the at least first MPDU in the second wireless communication channel while the at least second MPDU of the remaining MPDUs of the plurality of MPDUs within the data frame is being received. For example, with reference to FIG. 12, the first wireless communication device may transmit the second feedback information, e.g., in the feedback MPDU 1232, corresponding to MPDU 2 1212 (e.g., the at least first MPDU of the remaining MPDUs) in the feedback channel 1206 while MPDU 3 1216 or a portion thereof (e.g., the at least second MPDU) of the data frame 1204 is being received by the first wireless communication device in the feedback channel 1205. For example, based on the received MPDU 2 1212 which is transmitted by the second wireless communication device using MCS 5 in the example, the first wireless communication device may determine that a different MCS may be desirable for better decoding and demodulation of one or more subsequent MPDUs in the data frame 1204 and transmit the second feedback information in the feedback MPDU 1232 providing feedback, e.g., a new suggested MCS (or another transmission parameter), based on the received MPDU 2 1212. Following receipt of the second feedback information, the second wireless communication device (data frame transmitter) may decide to perform adjustments, e.g., in the MCS and/or one or more other transmission parameters, based on the received second feedback information and may transmit one or more subsequent MPDUs (for example a third MPDU) of the data frame 1204 based on the received second feedback information.

At 1810, the first wireless communication device may receive at least a third MPDU of the remaining MPDUs within the data frame based on the transmitted second feedback information. For example, based on the second feedback information, the at least third MPDU may be received with one or more different transmission parameters than corresponding transmission parameters associated with the received at least second MPDU. The difference in the one or more transmission parameters associated with the at least third MPDU may be due to adjustments based on the transmitted second feedback information. For example, with reference to FIG. 12, the at least third MPDU may include MPDU 4 1220 of the remaining MPDUs of the plurality of MPDUs within the data frame 1204. The MPDU 4 1220 which may be received based on the second feedback information (e.g., feedback in feedback MPDU 1232) that indicated a suggested MCS 3 to the second wireless communication device for transmission of one or more MPDUs including MPDU 4 1220.

In one configuration, the first wireless communication channel via which the at least one MPDU is data frame is received may occupy a first sub-band (e.g., set of frequencies) of a frequency band and the second wireless communication channel via which the feedback is transmitted may occupy a second non-overlapping sub-band of the frequency band. For example, the first and second sub-bands may have non-overlapping frequencies. For example, FIG. 3A depicts such an example where the data frame and the feedback may occupy different sub-bands of the same frequency band. In some other configurations, the first wireless communication channel may occupy a first frequency band (e.g., 5 GHz) and the second wireless communication channel may occupy a different non-overlapping frequency band (e.g., 2.4 GHz).

In one configuration, the second wireless communication channel (feedback channel) may be one of a plurality of different channels, the plurality of different feedback channels may correspond to (e.g., allocated to) a plurality of different wireless communication devices for transmitting respective feedback information. In such a configuration, the first wireless communication device discussed with respect to the method of flowcharts 1700 and 1800 may be one of the plurality of different devices that may be transmitting feedback. For example, FIGS. 4A-4C depict examples of multiple feedback channels corresponding to different users. In some example configurations, the feedback channel may be one of a plurality of feedback channels, where each feedback channel of the plurality of feedback channels may be for transmitting respective feedback information from the first wireless communication device to a respective one of a plurality of different devices, e.g., to STAs which may have sent data to the first wireless communication device (e.g., as in uplink MU-OFDMA/MIMO).

In various configurations, the first feedback information may be transmitted in at least one feedback MPDU during a feedback transmission opportunity (TXOP) associated with the second wireless communication channel. In some configurations, the feedback TXOP may start at the end of a preamble of the data frame, and continue till the end of the data frame, where the data frame preamble may precede the data frame, e.g., as illustrated in FIGS. 3A and 3C. In some other configurations, the feedback TXOP may start a fixed duration after the end of the preamble of the data frame and continue till the end of the data frame, e.g., as illustrated in FIGS. 3B, 3D, 4B and 4C.

In some configurations, the second wireless communication channel (feedback channel) may be one of a plurality of different feedback channels, where each feedback channel of the plurality of different feedback channels may have a corresponding feedback TXOP during which feedback information can be transmitted. In some such configurations, a start time of a feedback TXOP corresponding to a first feedback channel of the plurality of different feedback channels may be independent of a start time of a second feedback TXOP corresponding to a second feedback channel of the plurality of different feedback channels, e.g., as illustrated in FIGS. 4A-4C and discussed supra.

In some configurations, the first feedback information may include at least one of: power control information, a suggested MCS for use in transmission of one or more MPDUs by the transmitter of the data frame (second wireless communication device in the example discussed in connection with FIGS. 17 and 18), MIMO channel measurements, symbol decoding probability, MPDU decoding probability, MPDU pass/fail indication, preamble decoding status, interference level, or no-data.

As discussed supra, in some configurations, the first wireless communication device may receive, from the second wireless communication device, information indicating one or more channels that can be used for transmitting the first feedback information to the second wireless communication device. The feedback channel used by the first wireless communication device for transmitting the first and/or second feedback information may be one of the one or more channels. In some configurations, the information indicating the one or more channels that can be used for sending the first and/or second feedback information may be received before or during an association process with the second wireless communication device. In some other configurations, the information indicating the one or more channels which can be used for sending the first and/or second feedback information may be received after an association process with the second wireless communication device through one of, e.g., a ROMI mechanism or a TOMI mechanism. For example, in some configurations, the indication regarding the one or more channels for feedback may be received via managements frames, e.g., such as via a beacon, or association frame, or re-association frame. In one example configuration, the data frame may be a downlink data frame (e.g., from an 802.11 compliant AP) and the information indicating the one or more channels that can be used for transmitting the first and/or second feedback information may be received in one of a field of a preamble of the downlink data frame or within one of the MPDUs of the plurality of MPDUs. In some configurations, the information indicating the one or more channels that can be used for transmitting the first and/or second feedback information may be received in a trigger frame, e.g., as illustrated in FIG. 9.

In the preceding description while certain specific examples have been provided for specific feedback MPDUs (e.g., power control, MCS control, etc.), in an aspect several types of feedback information may be combined and transmitted in a single feedback MPDU. For example, a single feedback MPDU may communicate feedback relating to two or more of power control, MCS, channel measurement, MPDU pass fail indication, interference level, etc. Furthermore, in accordance with an aspect, unlike some cellular systems, the transmissions in the feedback channel may not be required to occur at fixed points in time. For example, discontinuous transmission within a feedback-TXOP is possible.

In one example configuration, the first feedback information may include power control information, where the power control information may indicate to the second wireless communication device whether to increase, decrease or hold a transmission power used in the transmission of the at least one MPDU when transmitting one or more subsequent MPDUs. In some examples, the increase or decrease in the transmission power may be by a predetermined amount known to the first and second wireless communication devices, or the increase or decrease in the transmission power may be indicated in the first feedback information. For example, the first feedback information may indicate whether the data frame transmitter (e.g., second wireless communication device in FIGS. 17 and 18 examples) should up (increase), down (decrease), or hold (maintain/leave unchanged) the transmission power used for transmission of one or more MPDUs transmitted by the transmitter of a data frame. The amount of increment/decrement in transmission power may be preconfigured and known to the first and second wireless communication devices or may be explicitly included in the feedback.

In one example configuration, the data frame may include a MIMO frame and the first feedback information may include MIMO channel measurements performed by the first wireless communication device based on one of a preamble corresponding to the data frame or a mid-amble of the data frame. For example, as discussed in connection with FIG. 13, the first wireless communication device (receiver) may perform channel estimation (for data channel 1305) based on the data frame preamble 1302. One or more transmissions in the data frame preamble 1302 may serve as a reference signal for the first wireless communication device to perform channel measurements. Furthermore, in some implementations, to enable the first wireless communication device to perform channel measurements at later stages, the second wireless communication device (transmitter of the data frame 1304) may transmit one or more mid-ambles, such as mid-amble 1314 and mid-amble 1318, to serve as a reference signal for channel measurements by the first wireless communication device. Accordingly, using the data frame preamble 1302 and mid-ambles 1314 and 1318, the first wireless communication device may perform MIMO channel measurements and provide feedback to the second wireless communication device.

In some configurations, the first wireless communication device and the second wireless communication device may support a full duplex operation. In one such configuration, the transmission of the first feedback information may occur simultaneously with the reception of the at least first MPDU of the remaining MPDUs of the plurality of MPDUs within the data frame. For example, the first wireless communication device may transmit at least a portion of the first feedback information while the at least first MPDU of the remaining MPDUs of the plurality of MPDUs within the data frame is being received. In such an example, the first wireless communication channel and the second wireless communication channel may be overlapping in frequency.

Figure 19:
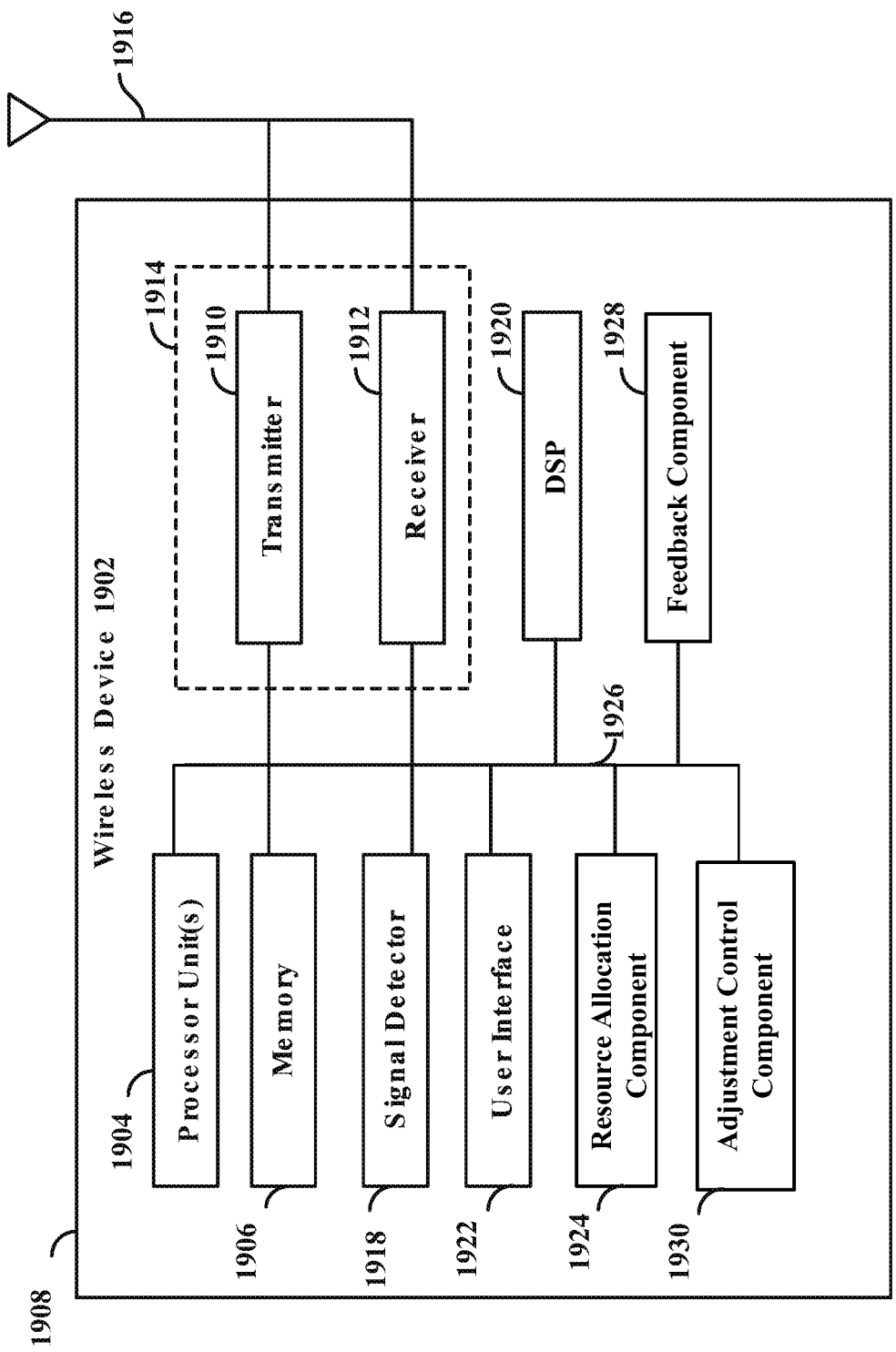
FIG. 19 shows a functional block diagram of an example wireless communication apparatus.

FIG. 19 shows an example functional block diagram of a wireless communication device 1902 within the wireless communication system 100 of FIG. 1. The wireless communication device 1902 is an example device that may be configured to implement the various methods described herein, e.g., methods/processes described with respect to flowcharts 1500, 1600, 1700 and/or 1800, as well as other processes described herein. For example, the wireless communication device 1902 may comprise an AP (e.g., the AP 104) or a station (e.g., station 114).

In some configurations, the wireless communication device 1902 may be configured to implement the method of flowchart 1500 and perform the function related to transmission of a data frame, receiving feedback information corresponding to at least one transmitted MPDU of the data frame from another device while at least another MPDU of the data frame is being transmitted, adjust one or more parameters based on the feedback, transmit one or more MPDUs of the data frame based on the received feedback information etc. For example, in one configuration, the wireless communication device 1902 may be a first wireless communication device (e.g., transmitter) transmitting a data frame to a second wireless communication device (e.g., receiver) and receiving feedback from the second wireless communication device while at least a portion of the data frame is still being transmitted, e.g., in accordance with the methods of flowcharts 1500 and/or 1600.

In some configurations, the wireless communication device 1902 may be further configured to implement the method of flowcharts 1700 and/or 1800 and perform the functions related to reception and processing of a data frame, transmission of feedback information corresponding to at least one MPDU of the data frame to a transmitter of the data frame while at least another MPDU of the data frame is still being received, receive one or more MPDUs of the data frame based on the transmitted feedback information, etc. For example, in one configuration, the wireless communication device 1902 may be a first wireless communication device (e.g., receiver) receiving a data frame from a second wireless communication device (e.g., transmitter) and transmitting feedback to the second wireless communication device while at least a portion of the data frame is still being received, e.g., in accordance with the method of flowcharts 1700 and/or 1800. Thus, depending on a given implementation, the wireless communication device 1902 may implement the method of flowchart 1500, 1600, 1700 or 1800.

The wireless communication device 1902 may include a processor 1904 which may control various operations of the wireless communication device 1902. The processor 1904 may also be referred to as a central processing unit (CPU). Memory 1906, which may include both read-only memory (ROM) and random access memory (RAM), may provide instructions and data to the processor 1904. A portion of the memory 1906 may also include non-volatile random access memory (NVRAM). The processor 1904 typically performs logical and arithmetic operations based on program instructions stored within the memory 1906. The instructions in the memory 1906 may be executable (by the processor 1904, for example) to implement the methods described herein.

The processor 1904 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless communication device 1902 may also include a housing 1908 and may further include a transmitter 1910 and/or a receiver 1912 to allow transmission and reception of data between the wireless communication device 1902 and a remote device. The transmitter 1910 and the receiver 1912 may be combined into a transceiver 1914. An antenna 1916 may be attached to the housing 1908 and electrically coupled to the transceiver 1914. The wireless communication device 1902 may also include multiple transmitters, multiple receivers, multiple transceivers, and/or multiple antennas.

The wireless communication device 1902 may also include a signal detector 1918 that may be used to detect and quantify the level of signals received by the transceiver 1914 or the receiver 1912. The signal detector 1918 may detect such signals as total energy, energy per subcarrier per symbol, power spectral density, and other signals. The wireless communication device 1902 may also include a DSP 1920 for use in processing signals. The DSP 1920 may be configured to generate a packet for transmission. In some aspects, the packet may comprise a physical layer convergence procedure (PLCP) PPDU.

The wireless communication device 1902 may further comprise a user interface 1922 in some aspects. The user interface 1922 may comprise a keypad, a microphone, a speaker, and/or a display. The user interface 1922 may include any element or component that conveys information to a user of the wireless device 1902 and/or receives input from the user.

In some configurations, the wireless communication device 1902 may further comprise a resource allocation component 1924, a feedback component 1928, and an adjustment control component 1930. For example, in some configurations, e.g., where the wireless communication device 1902 may be a first wireless communication device (e.g., the transmitter of a data frame) implementing the method of flowchart 1500, the transmitter 1910 may be configured to transmit, to a second wireless communication device, at least one MPDU of a plurality of MPDUs within a data frame via a first wireless communication channel. In such a configuration, the resource allocation component 1924 may be configured to allocate resources to one or more receivers of the data frame for providing feedback, e.g., allocate one or more feedback channels via which the one or more other receiver of the data fame may transmit feedback related to the at least one MPDU of the received data frame. For example, in one such configuration, the resource allocation component 1924 may be configured to transmit (e.g., via the transmitter 1910) to a second wireless communication device (e.g., receiver of the data frame) information indicating one or more channels that can be used for transmitting feedback information, e.g., feedback corresponding one or more MPDUs of the data frame. Furthermore, in some such configurations, the feedback component 1928 may be configured to receive (e.g., via the receiver 1912) and process feedback information from the second wireless communication device while the data frame is being transmitted by the wireless communication device 1902 and provide an input to the adjustment control component 1930. For example, in one such configuration, the feedback component 1928 may be configured to receive (e.g., via the receiver 1912) first feedback information corresponding to the at least one MPDU in a second wireless communication channel while at least a first MPDU of the remaining MPDUs of the plurality of MPDUs within the data frame is being transmitted by the first wireless communication device.

In such configurations, the adjustment control component 1930 may be configured to implement operations related to performing adjustments, e.g., adjustment of one or more transmission parameters and/or other parameters associated with one or more MPDUs of a data frame transmission (e.g., transmission power, MCS, transmission rate, etc.), based on feedback information received by the wireless device 1902 from the second wireless communication device. For example, in one such configuration, the adjustment control component 1930 may be further configured to adjust one or more transmission parameters associated with the transmission of at least a second MPDU of the remaining MPDUs of the plurality of MPDUs within the data frame based on the first feedback information, where the one or more adjusted transmission parameters may be different than corresponding transmission parameters used by the first wireless communication device to transmit the at least one MPDU. The adjustment control component 1930 may be further configured to transmit (e.g., via the transmitter 1910) the at least a second MPDU of the remaining MPDUs of the plurality of MPDUs within the data frame based on the first feedback information (e.g., after adjustments in accordance with the received feedback). In some such configurations, the feedback component 1928 may be further configured to receive (e.g., via the receiver 1912) second feedback information corresponding to the at least first MPDU of the remaining MPDUs within the data frame in the second wireless communication channel while the at least second MPDU of the remaining MPDUs of the plurality of MPDUs within the data frame is being transmitted. Furthermore, the adjustment control component 1930 may be further configured to adjust/modify one or more transmission parameters associated with the transmission of a third MPDU of the remaining MPDUs of the plurality of MPDUs within the data frame based on the second feedback information, and transmit (e.g., via the transmitter 1910) the third MPDU of the remaining MPDUs within the data frame based on the one or more transmission parameters that have been adjusted based on the received second feedback information.

In some other configurations, the wireless communication device 1902 may be a first wireless communication device (e.g., a receiver of a data frame transmitted by a second wireless communication device) implementing the method of flowchart 1700 and/or flowchart 1800. In such configurations, the receiver 1912 may be configured to receive from the second wireless communication device, at least one MPDU of a plurality of MPDUs within a data frame via a first wireless communication channel. The receiver 1912 may be further configured to receive from the second wireless communication device, information indicating one or more channels that can be used for transmitting feedback information to the second wireless communication device. In such configurations, the feedback component 1928 may be configured to perform operations related to providing feedback information while one or more MPDUs of the data frame are being received by the wireless communication device 1902, in accordance with various features described above in detail with respect to FIGS. 3-18. For example, in one such configuration, the feedback component 1928 may be configured to transmit (e.g., via the transmitter 1910) to the second wireless communication device, first feedback information corresponding to the at least one MPDU in a second wireless communication channel while at least a first MPDU of the remaining MPDUs of the plurality of MPDUs within the data frame is being received by the first wireless communication device.

In such a configuration, based on the transmitted feedback, the wireless communication device 1902 may receive one or more other subsequent MPDUs of the data frame. For example, in one such configuration, the receiver may be configured to receive at least a second MPDU of the remaining MPDUs of the plurality of MPDUs within the data frame based on the transmitted first feedback information. For example, the at least second MPDU may be received with one or more different transmission parameters (such as at an MCS, a transmission power, a transmission rate, etc.) than corresponding transmission parameter(s) associated with the at least one MPDU received earlier. The difference in the one or more transmission parameters may be due to adjustments to the transmission parameter(s) associated with the at least one MPDU based on the transmitted first feedback information. In some such configurations, the feedback component 1928 may be configured to transmit (e.g., via the transmitter 1910) to the second wireless communication device, second feedback information corresponding to the at least first MPDU of the remaining MPDUs within the data frame in the second wireless communication channel while the at least second MPDU of the remaining MPDUs of the plurality of MPDUs within the data frame is being received. Furthermore, in some such configurations, the receiver may be further configured to receive at least a third MPDU of the remaining MPDUs within the data frame based on the transmitted second feedback information. For example, the at least third MPDU of the remaining MPDUs within the data frame may be received with one or more different transmission parameters than the at least second MPDU.

The various components of the wireless device 1902 may be coupled together by a bus system 1926. The bus system 1926 may include a data bus, for example, as well as a power bus, a control signal bus, and a status signal bus in addition to the data bus. Components of the wireless device 1902 may be coupled together or accept or provide inputs to each other using some other mechanism.

Although a number of separate components are illustrated in FIG. 19, one or more of the components may be combined or commonly implemented. For example, the processor 1904 may be used to implement not only the functionality described above with respect to the processor 1904, but also to implement the functionality described above with respect to the signal detector 1918, the DSP 1920, the user interface 1922, and/or the resource allocation component 1924. Further, each of the components illustrated in FIG. 19 may be implemented using a plurality of separate elements.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an application specific integrated circuit (ASIC), an FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method for wireless communication by a first wireless communication device, comprising:
   receiving, from a second wireless communication device, at least one medium access control (MAC) protocol data unit (MPDU) of a plurality of MPDUs within a data frame via a first wireless communication channel; and
   transmitting, to the second wireless communication device, first feedback information corresponding to the at least one MPDU in a feedback MPDU via a second wireless communication channel during a feedback transmission opportunity (TXOP) associated with the second wireless communication channel while at least a first MPDU of the remaining MPDUs of the plurality of MPDUs within the data frame is being received by the first wireless communication device via the first wireless communication channel, the feedback TXOP starting at the end of a preamble of the data frame or a fixed duration after the end of the preamble; and
   receiving, from the second wireless communication device, at least a second MPDU of the remaining MPDUs of the plurality of MPDUs within the data frame, the at least second MPDU being received with one or more different transmission parameters than the at least one MPDU.

2. The method of claim 1, wherein the one or more different transmission parameters comprise at least one of a modulation and coding scheme (MCS), a transmission power, or a transmission rate.

3. The method of claim 1, wherein the first feedback information includes at least one of: power control information, modulation and coding scheme (MCS) control information, multiple input multiple output (MIMO) channel measurements, a symbol decoding probability, an MPDU decoding probability, an MPDU pass/fail indication for the at least one MPDU, a preamble decoding status, or interference information.

4. The method of claim 3, wherein the first feedback information includes power control information, the power control information indicating to the second wireless communication device whether to increase, decrease or maintain a transmission power used in the transmission of the at least one MPDU when transmitting one or more of the remaining MPDUs of the plurality of MPDUs.

5. The method of claim 3, wherein the data frame comprises a multiple input multiple output (MIMO) frame and wherein the first feedback information includes MIMO channel measurements performed by the first wireless communication device based on a preamble of the data frame or a mid-amble of the data frame.

6. The method of claim 1, wherein:
   the first wireless communication channel occupies a first sub-band of a frequency band and the second wireless communication channel occupies a second non-overlapping sub-band of the frequency band; or
   the first wireless communication channel occupies a first frequency band and the second wireless communication channel occupies a second non-overlapping frequency band.

7. The method of claim 1, wherein the first wireless communication device transmits at least a portion of the first feedback information while the at least first MPDU of the remaining MPDUs of the plurality of MPDUs within the data frame is being received, the first wireless communication channel and the second wireless communication channel overlapping in frequency.

8. The method of claim 1, wherein the second wireless communication channel is one of a plurality of feedback channels, each feedback channel of the plurality of feedback channels for transmitting respective feedback information from the first wireless communication device to a respective one of a plurality of different devices.

9. The method of claim 1, further comprising receiving, from the second wireless communication device prior to transmitting the first feedback information, information indicating one or more channels that can be used for transmitting the first feedback information to the second wireless communication device, the second wireless communication channel being one of the one or more channels.

10. The method of claim 9, wherein the information indicating the one or more channels that can be used for transmitting the first feedback information is received during an association process with the second wireless communication device or after the association process through one of a receive operating mode indication (ROMI) mechanism or a transmit operating mode indication (TOMI) mechanism.

11. The method of claim 9, wherein the information indicating the one or more channels that can be used for transmitting the first feedback information is received in a preamble of the data frame or within one of the MPDUs of the plurality of MPDUs.

12. A first wireless communication device, comprising:
at least one processor; and
at least one memory coupled to the at least one processor and storing processor-executable code that, when executed by the at least one processor, causes the first wireless communication device to:
receive, from a second wireless communication device, at least one medium access control (MAC) protocol data unit (MPDU) of a plurality of MPDUs within a data frame via a first wireless communication channel;
receive, from the second wireless communication device, information indicating one or more channels that can be used for transmitting first feedback information to the second wireless communication device; and
transmit, to the second wireless communication device, the first feedback information corresponding to the at least one MPDU in a second wireless communication channel while at least a first MPDU of the remaining MPDUs of the plurality of MPDUs within the data frame is being received via the first wireless communication channel; wherein the second wireless communication channel being one of the one or more indicated channels.

13. The first wireless communication device of claim 12, wherein the at least one processor is further configured to receive at least a second MPDU of the remaining MPDUs of the plurality of MPDUs within the data frame, the at least second MPDU being received with one or more different transmission parameters than the at least one MPDU.

14. The first wireless communication device of claim 13, wherein the one or more different transmission parameters comprise at least one of a modulation and coding scheme (MCS), a transmission power, or a transmission rate.

15. The first wireless communication device of claim 12, wherein the first feedback information includes at least one of: power control information, modulation and coding scheme (MCS) control information, multiple input multiple output (MIMO) channel measurements, a symbol decoding probability, an MPDU decoding probability, an MPDU pass/fail indication for the at least one MPDU, a preamble decoding status, or interference information.

16. The first wireless communication device of claim 12, wherein:
the first wireless communication channel occupies a first sub-band of a frequency band and the second wireless communication channel occupies a second non-overlapping sub-band of the frequency band; or
the first wireless communication channel occupies a first frequency band and the second wireless communication channel occupies a second non-overlapping frequency band.

17. The first wireless communication device of claim 12, wherein the first wireless communication device transmits at least a portion of the first feedback information while the at least first MPDU of the remaining MPDUs of the plurality of MPDUs within the data frame is being received, the first wireless communication channel and the second wireless communication channel overlapping in frequency.

18. The device of claim 12, wherein the first feedback information is transmitted in at least one feedback MPDU during a feedback transmission opportunity (TXOP) associated with the second wireless communication channel, the feedback TXOP starting at the end of a preamble of the data frame or a fixed duration after the end of the preamble.

19. A method for wireless communication by a first wireless communication device, comprising:
transmitting, to a second wireless communication device, at least one medium access control (MAC) protocol data unit (MPDU) of a plurality of MPDUs within a data frame via a first wireless communication channel;
receiving, from the second wireless communication device, first feedback information corresponding to the at least one MPDU in a second wireless communication channel while at least a first MPDU of the remaining MPDUs of the plurality of MPDUs within the data frame is being transmitted by the first wireless communication device;
adjusting one or more transmission parameters associated with the transmission of at least a second MPDU of the remaining MPDUs of the plurality of MPDUs within the data frame based on the first feedback information, the one or more adjusted transmission parameters being different than corresponding transmission parameters used by the first wireless communication device to transmit the at least one MPDU; and
transmitting the at least second MPDU based on the adjusted one or more transmission parameters.

20. The method of claim 19, wherein the one or more adjusted transmission parameters comprise at least one of a modulation and coding scheme (MCS), a transmission power, or a transmission rate.

21. The method of claim 19, wherein the first feedback information includes at least one of: power control information, modulation and coding scheme (MCS) control information, multiple input multiple output (MIMO) channel measurements, a symbol decoding probability, an MPDU decoding probability, an MPDU pass/fail indication for the at least one MPDU, a preamble decoding status, or interference information.

22. The method of claim 19, wherein:
the first wireless communication channel corresponds to a first sub-band of a frequency band and the second wireless communication channel corresponds to a second non-overlapping sub-band of the frequency band; or the first wireless communication channel corresponds to a first frequency band and the second wireless communication channel corresponds to a second non-overlapping frequency band.

23. The method of claim 19, further comprising transmitting, to the second wireless communication device prior to receiving the first feedback information, information indicating one or more channels that can be used for transmitting the first feedback information, the second wireless communication channel being one of the one or more channels.

24. The method of claim 19, wherein the second wireless communication channel is one of a plurality of feedback channels, each feedback channel of the plurality of feedback channels corresponding to a different respective wireless communication device of a plurality of different devices for receiving feedback information from the respective wireless communication device, the second wireless communication device being one of the plurality of different devices.

25. A first wireless communication device for wireless communication, comprising:
  at least one processor; and
  at least one memory coupled to the at least one processor and storing processor-executable code that, when executed by the at least one processor, causes the first wireless communication device to:
    transmit, to a second wireless communication device, at least one medium access control (MAC) protocol data unit (MPDU) of a plurality of MPDUs within a data frame via a first wireless communication channel;
    receive, from the second wireless communication device, first feedback information corresponding to the at least one MPDU in a second wireless communication channel while at least a first MPDU of the remaining MPDUs of the plurality of MPDUs within the data frame is being transmitted via the first wireless communication channel;
    adjust one or more transmission parameters associated with the transmission of at least a second MPDU of the remaining MPDUs of the plurality of MPDUs within the data frame based on the first feedback information, the one or more adjusted transmission parameters being different than corresponding transmission parameters used by the first wireless communication device to transmit the at least one MPDU; and
    transmit the at least second MPDU based on the adjusted one or more transmission parameters.

26. The first wireless communication device of claim 25, wherein:
  the first wireless communication channel corresponds to a first sub-band of a frequency band and the second wireless communication channel corresponds to a second non-overlapping sub-band of the frequency band; or
  the first wireless communication channel corresponds to a first frequency band and the second wireless communication channel corresponds to a second non-overlapping frequency band.

* * * * *